(12) United States Patent
Staub

(10) Patent No.: US 8,001,029 B2
(45) Date of Patent: Aug. 16, 2011

(54) METHOD AND COMPUTER PROGRAM FOR TAX SENSITIVE INVESTMENT PORTFOLIO MANAGEMENT

(75) Inventor: Renato Staub, Northfield, IL (US)

(73) Assignee: UBS AG, Zurich (CH)

( * ) Notice: Subject to any disclaimer, the term of this patent is extended or adjusted under 35 U.S.C. 154(b) by 1168 days.

(21) Appl. No.: 10/810,107

(22) Filed: Mar. 26, 2004

(65) Prior Publication Data

US 2005/0234793 A1 Oct. 20, 2005

(51) Int. Cl.
G06Q 40/00 (2006.01)
(52) U.S. Cl. ......... 705/36 T; 705/35; 705/36 R; 705/37
(58) Field of Classification Search ................ 705/36 T, 705/36 R, 35, 37
See application file for complete search history.

(56) References Cited

U.S. PATENT DOCUMENTS

| | | | | |
|---|---|---|---|---|
| 4,334,270 A * | 6/1982 | Towers | ........................ | 705/36 R |
| 6,240,399 B1 * | 5/2001 | Frank et al. | ................. | 705/36 R |
| 6,484,151 B1 | 11/2002 | O'Shaughnessy | | |
| 6,601,044 B1 | 7/2003 | Wallman | | |
| 6,687,681 B1 * | 2/2004 | Schulz et al. | ................. | 705/36 T |
| 6,832,209 B1 * | 12/2004 | Karp et al. | ..................... | 705/36 T |
| 7,016,873 B1 * | 3/2006 | Peterson et al. | ............. | 705/36 R |
| 7,117,175 B2 * | 10/2006 | Arnott | .......................... | 705/36 R |
| 7,177,831 B1 * | 2/2007 | O'Shaughnessy et al. | . | 705/36 R |
| 7,321,871 B2 * | 1/2008 | Scott et al. | ................... | 705/36 R |
| 7,668,773 B1 * | 2/2010 | Pruitt | ........................... | 705/36 T |
| 7,822,667 B1 * | 10/2010 | Smith et al. | ................. | 705/36 R |
| 2002/0059127 A1 * | 5/2002 | Brown et al. | ................... | 705/36 |
| 2003/0229561 A1 * | 12/2003 | Wallman | .......................... | 705/36 |
| 2004/0128219 A1 * | 7/2004 | Hilton | .............................. | 705/36 |
| 2004/0148241 A1 * | 7/2004 | Qi et al. | .......................... | 705/36 |
| 2007/0055599 A1 * | 3/2007 | Arnott | .............................. | 705/35 |

FOREIGN PATENT DOCUMENTS

WO WO 00/75821 * 12/2000

OTHER PUBLICATIONS

Francis: "Mutual-Fund Records Pay Off at Tax Time", Wall Street Journal. (Eastern edition), New York, N. Y., Nov 16, 2001. p. C.1.*
Lauricella: "Making Rebalancing Automatic—Firms Now Offer an Option Many Investors Find Hard to Carry Out on Their Own", Wall Street Journal. (Europe), Brussels: Feb 17, 2003. p. M.4.*
Ammann, et al: "Tracking error and tactical asset allocation", Financial Analysts Journal, Charlottesville, Mar./Apr. 2001. vol. 57, Iss. 2; p. 32, 12 pgs.*
Merriam-Webster Collegiate Dictionary, Tenth Edition, Merriam-Webster Incorporated, Springfield, Massachusetts, copyright 1997.*

(Continued)

*Primary Examiner* — Narayanswamy Subramanian
*Assistant Examiner* — Ed Baird
(74) *Attorney, Agent, or Firm* — Pillsbury Winthrop Shaw Pittman LLP

(57) ABSTRACT

Methods and corresponding systems are provided for managing investment portfolios that includes the steps of identifying at least one security of the investment portfolio to be sold during rebalancing of the investment portfolio, and rebalancing or deferring rebalancing of the investment portfolio based at least in part on a rebalancing threshold for short-term capital gains or losses, investor specified or otherwise. If an implied total short-term capital gain or loss, e.g., a loss or gain that would occur if the at least one security were sold, falls within the rebalancing threshold rebalancing occurs, otherwise rebalancing is deferred for a later time.

16 Claims, 25 Drawing Sheets

OTHER PUBLICATIONS

United States Published Application No. 2003/0088492, entitled Method and apparatus for creating and managing a visual representation of a portfolio and determining an efficient allocation.

United States Published Application No. 2002/0138381, entitled Individually managed accounts with multiple style allocations options.

United States Published Application No. 2002/0138386, entitled User interface for a financial advisory system.

United States Published Application No. 2002/0174045, entitled System, method, and computer Program product for cost effective, dynamic allocation of assets among a plurality of investments.

* cited by examiner

FIG. 3    STG between 1993 and 2002, FNC

| Approach | Sum of Taxes | NAV | annual NAV increase |
|---|---|---|---|
| FNC | 42852 | 190321 | 7.41% |
| FWC | 55529 | 196630 | 7.80% |
| SNC | 41045 | 192646 | 7.56% |
| SWC | 40532 | 208152 | 8.49% |
| SWC - Avg. | 43233 | 206836 | 8.41% |

FIG. 17

| Measure | Date | |
|---|---|---|
| | 3/31/97 | 4/30/99 |
| Risk | | |
| SP500 | 15.4% | 14.1% |
| Strategy | 16.2% | 14.7% |
| Portfolio | 15.5% | 13.5% |
| Tracking Error | | |
| Strategy vs. SP500 | 5.1% | 6.2% |
| Portfolio vs. SP500 | 4.4% | 7.5% |
| Portfolio vs. Strategy | 3.3% | 5.7% |
| Beta | | |
| Strategy vs. SP500 | 0.99 | 0.95 |
| Portfolio vs. SP500 | 0.96 | 0.82 |
| Portfolio vs. Strategy | 0.94 | 0.85 |

FIG. 18

METHOD AND COMPUTER PROGRAM FOR TAX SENSITIVE INVESTMENT PORTFOLIO MANAGEMENT

BACKGROUND OF THE INVENTION

The present invention generally relates to investment portfolio management and individual security selection in the rebalancing of investment portfolios in a tax sensitive manner. More particularly, the present invention relates to a methodology and computer systems and programs designed to consider a particular investor's tax situation in the rebalancing of that investor's investment portfolio.

Investment advisers offer professional investment advice to investors through many different vehicles. One such vehicle is the separately managed account ("SMA"). A separately managed account is an individualized portfolio of securities that is owned and held directly by an investor and typically managed under the discretion of a professional investment adviser. To create a separately managed account, an investor works with an investment adviser to define an investor profile and to develop an investment strategy that reflects this profile, taking into account that investor's overall investment objectives and goals, risk tolerance levels and tax sensitivities. A typical SMA program may offer several pre-determined target portfolios from which participants may select, depending upon their investor profile.

Each target portfolio may contain allocations of securities from various market segments and sectors. The investor's SMA will contain individual securities that track the allocations of the selected target portfolio. Periodic rebalancing of the SMA is generally necessary to maintain the desired target portfolio allocation given that security values fluctuate over time. Generally, an investment adviser will rebalance an SMA on a regular basis such as quarterly and in the event that the imbalance of the SMA's portfolio allocations has exceeded a pre-set tolerance level. Rebalancing may also be required in the event that an investor's investment profile changes whether due to life events or otherwise.

Rebalancing or a change of the adviser's strategy, however, always involves the purchase and sale of securities that generate costs for the investor, including brokerage costs, administrative fees and taxable capital gains. Capital gains that are characterized as short-term under the US Internal Revenue Code are taxed at a significantly higher level than long-term capital gains. Generally, investors prefer to avoid taxable capital gains, particularly taxable short-term capital gains, in making investment decisions. Certain investors, however, have special tax circumstances that may cause them to seek the realization of capital gains or losses.

A number of investment systems and methods have been developed that are designed to assist investors in allocating assets within their portfolios and to help mitigate the costs associated with portfolio management, such as U.S. Pat. No. 6,484,151, entitled "System and method for selecting and purchasing stocks via a global computer network", and U.S. Pat. No. 6,601,044, entitled "Method and apparatus for enabling individual or smaller investors or others to create and manage a portfolio of securities or other assets or liabilities on a cost effective basis", U.S. Published Application No. 2002/0174045, entitled "System, method, and computer program product for cost effective, dynamic allocation of assets among a plurality of investments", 2002/0138386, entitled "User interface for a financial advisory system", 2003/0088492, entitled "Method and apparatus for creating and managing a visual representation of a portfolio and determining an efficient allocation", and 2002/0138381, entitled "Individually managed accounts with multiple style allocations options", and International PCT Published Application No. WO 01/31538, entitled "Investment advice systems and methods", each of which is hereby incorporated herein in its entirety. None of these systems or methods, however, provide a decision overlay that is designed to assist investors in the rebalancing of investment portfolios by identifying specific securities for sale by their tax lots in order to fit within a pre-set tax tolerance. Accordingly, there is a need for a method and system for managing investment portfolios that provide investors with a decision overlay that identifies specific securities by their tax lot for sale in a manner designed to optimize the tax effects of the security sale with respect to that investor's individual tax situation.

SUMMARY OF THE INVENTION

The present invention generally provides methods, systems, and computer programs for managing investment portfolios. An investment adviser having discretion over an investor's account will make investment decisions according to the investor's stated investment objectives. Because asset values and because the adviser's strategy most likely change over time, an investment adviser typically will rebalance the portfolio periodically in order to maintain the portfolio's compliance with the investor's stated investment objectives. Rebalancing involves the sale and purchase of select portfolio securities to maintain the portfolio's compliance with the investor's investment objectives. There are costs associated with rebalancing, however, such as brokerage, administration and taxes. The present invention generally provides a tax overlay methodology that identifies an ideal basket of portfolio securities for rebalancing in order to manage the investor's exposure to short-term capital gains or losses, based on a pre-set tolerance level for the same.

In one aspect of the present invention, novel methods and systems for identifying securities within an investment portfolio for sale for purposes of rebalancing are provided that include the steps of identifying an optimal basket of securities across one or more tax lots of a particular security holding. Depending upon the tax sensitivity pre-set, e.g., by the investor, the basket of securities identified for sale may be across multiple tax lots and may consist of securities representing only portions of a particular tax lot.

In another aspect of the present invention, methods, systems and computer programs are provided for managing investment portfolios are provided that includes the steps of identifying at least one investment portfolio security or a plurality of securities, e.g., an ideal or optimal set of securities, to be sold in connection with a rebalancing of the investment portfolio, and rebalancing the investment portfolio if a short-term capital gain or losses, which would result from the rebalancing of the investment portfolio, falls within a threshold for short-term capital gains or losses. The securities to be sold may be identified in a variety of ways. In one embodiment, the security or securities to be sold are identified based on a difference between securities in the investment portfolio and a target portfolio. In another embodiment, the securities to be sold are further identified by allocating the security or securities to be sold to at least one tax lot associated with the security or securities to be sold, and computing an implied total short-term capital gain or loss that would result from the sale of the security or securities to be sold from the tax lot.

In one embodiment, the securities to be sold are allocated to at least one tax lot associated with the securities to be sold based on at least one allocation strategy selected from the group that includes allocating the securities to be sold beginning with an earlier tax lot of a plurality of tax lots and proceeding to a later tax lot, and allocating the securities to be sold beginning with a tax lot of a plurality of tax lots having a higher cost basis and proceeding to a tax lot with a lower cost basis. In another embodiment, the securities to be sold are allocated randomly to a plurality of tax lots. The securities are preferably allocated randomly, a plurality of times, to a plurality of tax lots associated with the securities to be sold. In this instance, an implied total short-term capital gain or loss that would result from the sale of the plurality of securities to be sold in accordance with each of the random allocations is computed and the allocation, from the plurality of random allocations, that results in the smallest implied short-term capital gain or loss or one that most closely matches a pre-set targeted short-term capital gain or loss is selected as the identified securities to be sold.

The implied short-term capital gain or loss may be for the individual security to be sold, for the aggregate securities, or for the total short-term capital gain or loss for the year. Thus, in one embodiment, the portfolio is rebalanced if the aggregate or total short-term capital gain for the year, which would result from the rebalancing of the investment portfolio, falls with a threshold for short-term capital gains or losses. In one embodiment, the threshold for short-term capital gains or losses is about 2% of the value of investment portfolio's assets, which threshold may be defined by an investor.

In another aspect of the present invention, the method for managing investment portfolios includes the steps of determining a difference between securities in the investment portfolio and a target portfolio, identifying a plurality of securities to be sold based on the determined difference, allocating randomly, a plurality of times, the securities to be sold to a plurality of tax lots associated with the securities to be sold, computing an implied total short-term capital gain or loss that would result from the sale of the plurality of securities to be sold in accordance with each of the random allocations, selecting from the plurality of random allocations the allocation that results in the smallest implied short-term capital gain or loss; and rebalancing the investment portfolio if the implied short-term capital gain or loss for the selected random allocation falls within a threshold for short-term capital gains or losses.

Additional aspects of the present invention will be apparent in view of the description that follows.

BRIEF DESCRIPTION OF THE FIGURES

The invention is illustrated in the figures of the accompanying drawings, which are meant to be exemplary and not limiting, in which like references refer to like or corresponding parts, and in which:

FIGS. 3-26 are graphs and tables showing estimated results rebalancing based on a plurality of rebalancing strategies in accordance with the present invention.

DETAILED DESCRIPTION OF PREFERRED EMBODIMENTS

Figure 1:
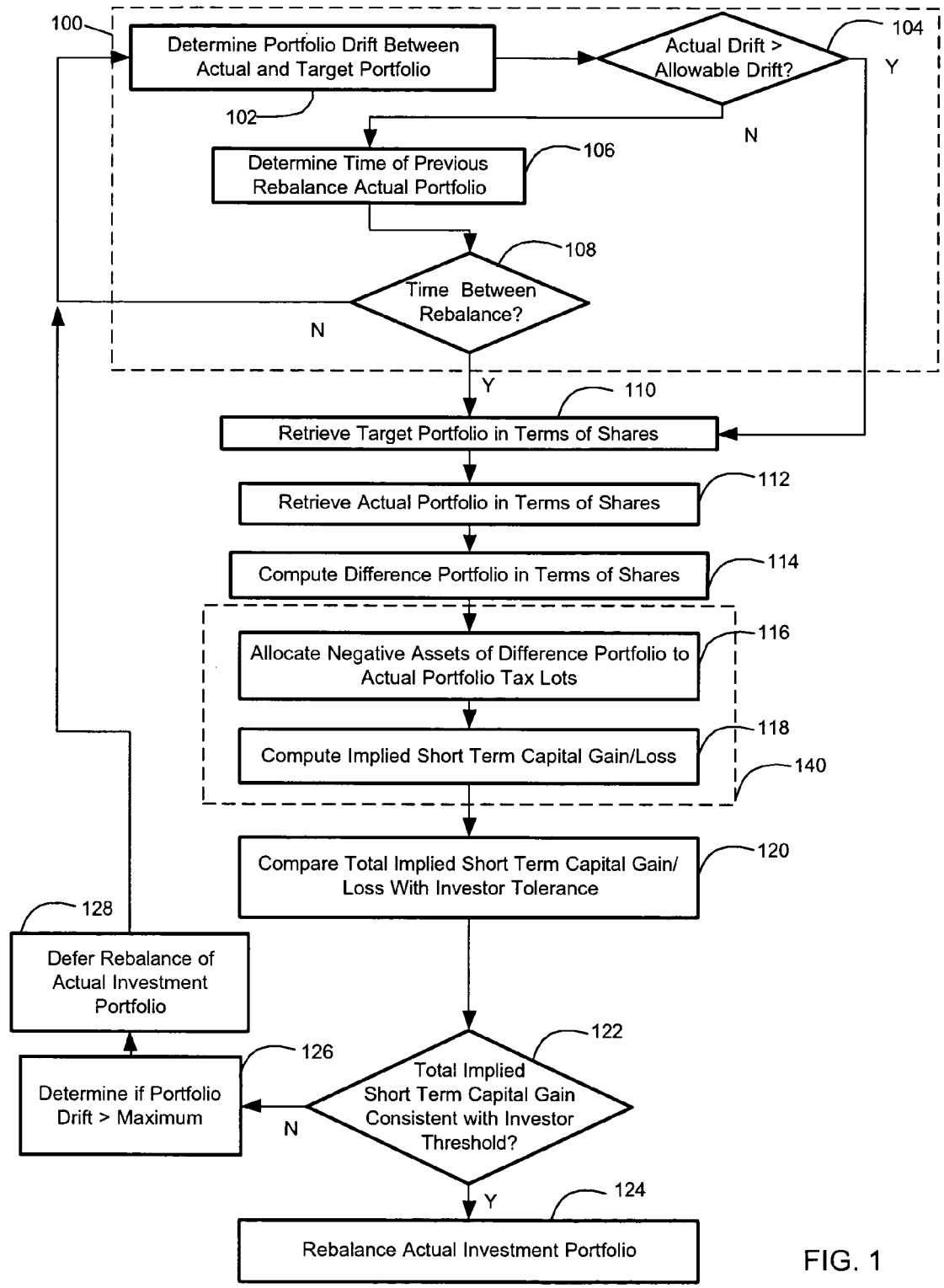
FIG. 1 is a flow diagram of a method for managing investment portfolios according to one embodiment of the invention.

We have found that the transition from short-term gains to long-terms gains is by far the biggest contributor to performance after tax. That is, we should not pick any share available for liquidating part of a particular position. Rather, as the various shares of a particular stock position may have been acquired over time, we should select the tax lot supporting our target function, i.e. performance after tax. Accordingly, we provide a strategy for tax lot management, which is an overlay process that must not override the investment strategy's prime character. As a result, there is still a strong relationship between the tax lot management strategy and the effective portfolio.

The following example demonstrates the importance of tax lot management and liquidation timing. To that end, assume the following portfolio: Stock A: 17 shares bought @ 20 and 9 shares @ 25; Stock B: 5 shares bought @ 41 and 7 shares @ 50. Assume further, there is now a change in the target allocation: 24×A plus 13×B. That is, we need to sell 2×A and to buy 1×B. While there is only one way to buy B, there are three ways to sell 2×A: 1) sell 2×A bought @ 20, 2) sell 2×A bought @ 25, and 3) sell 1×A bought @ 20 and sell 1×A bought @ 25. Assuming the value of A=23 per share and a 30% tax rate, these three different ways of liquidating A have the following tax (T) implications for the portfolio: 1) $T=\max(0,2(23-20)\cdot 0.3)=1.80$, 2) $T=\max(0,2(23-25)\cdot 0.3)=0.00$, and 3) $T=\max(0,(23-20+23-25)\cdot 0.3=0.30$. Although the new stock positions are identical in all three instances, there are different tax implications.

We present three main ways to liquidate securities: First-In-First-Out (FIFO) Last-In-First-Out (LIFO), and Specific Identification (SI). FIFO generally means that we liquidate beginning with the farthest tax lots. For example, the following tax lot data: 22 shares of stock A are bought at time (2), 17 more at time (3), and another 15 at time (6). With the FIFO strategy, shares are first sold from tax lot (2), then lot (3) if tax lot (2) contains less than the shares to be liquidated, followed by tax lot (6). LIFO generally means that we liquidate beginning with the closest tax lots. With LIFO, shares of A are sold beginning from tax lot (6), then tax lot (3), and finally tax lot (2). As LIFO is biased towards realizing short-term gains we do not consider it any further. SI or Specific Identification means that the tax lots for every individual share to be sold are selected by choice, e.g., 4 shares from tax lot (2), 12 shares from tax lot (3), and 3 shares from tax lot (6), etc. Ultimately, it is our idea to generate a whole set of randomly selected Specific Identifications and selected thereafter the one, which fits best our target function under the given constraints. The key idea behind a random approach is the fact that there is no analytical way of finding "the solution" for path-dependent problems such as tax-efficient investing.

Further, we distinguish between constrained and unconstrained methods. Unconstrained means that the portfolio follows perfectly the investment strategy and constrained means that the portfolio does not perfectly follow the strategy under certain circumstances. For instance, the constraining variable may be the estimate of the tracking error between the strategy and the portfolio, or any other constraints as discussed below.

Referring to FIG. 1, a method for managing at least one investment portfolio, such as a separately managed account ("SMA") investment portfolio, according to one embodiment of the present invention begins at 100 with identifying or determining whether at least one portfolio is a candidate for rebalancing. A portfolio may be a candidate for rebalancing based on a variety of factors. In one embodiment, the portfolio is identified as a candidate for rebalancing by testing or otherwise determining at 102 if portfolio drift or an imbalance has occurred between an actual investment portfolio and a corresponding target portfolio. The term "actual investment portfolio" is used herein to denote an investment portfolio containing one or more securities actually held by an investor, which is hereinafter simply referred to as an investment portfolio.

A target portfolio is generally used as a model or benchmark for managing the investment portfolio in an effort to maintain an investment portfolio that has securities therein at an allocation that tracks the allocations of the target portfolio. The target portfolio may be expressed in many ways. The target portfolio may, for example, be expressed in terms particular types securities or allocations of particular types of securities. The types of securities, for instance, may be expressed with reference to the particular market segment and/or sector that particular securities belong, such as small-cap, mid-cap, or large-cap classes of securities, aggressive growth, growth, or value classes of securities, or a combination thereof. The target portfolio may further be defined in greater detail or granularity, such as by subclass, particular securities, quantity, price, etc. For example, a target portfolio may include 100 shares of A corp., 200 shares of B corp., etc.

If at 104 it is determined that a sufficient amount of portfolio drift has not occurred or that there is no imbalance with respect to the investment portfolio allocation, the system may continue monitoring the investment portfolio for portfolio drift. If at 104 a sufficient amount of portfolio drift has occurred, e.g., the actual drift is greater than an allowable or pre-set tolerance for drift, the investment portfolio is identified as a candidate for rebalancing. An amount of portfolio drift sufficient to trigger rebalancing may be a constant or a variable amount, and may be specified by either the investor or the asset management company. Various factors may be used to determine the amount of drift sufficient to trigger rebalancing, including the cost of rebalancing, market conditions, etc. For instance, if the cost of trading particular types of investment portfolio securities that have drifted is relatively high, a higher portfolio drift or allowable drift may be tolerated than if the drift occurred with regard to investment portfolio securities that have a lower trading cost associated therewith. In one embodiment, the maximum allowable drift is from about 1% to about 5%.

In one embodiment, at 106 a portfolio is identified as a candidate for rebalancing by testing the time from the previous rebalancing of the actual investment portfolio to determine if at 108 a sufficient amount of time since the previous rebalancing has lapsed. If at 108 a sufficient amount of time has not lapsed, the system may continue monitoring the investment portfolio to determine if the investment portfolio is a candidate for rebalancing based on a periodic rebalancing schedule, e.g., monthly, quarterly, semiannually, annually, etc. If at 108 a sufficient amount of time has lapsed, the investment portfolio is identified as a candidate for rebalancing. The amount of time sufficient to trigger a periodic rebalancing may be a constant or a variable amount, and may similarly vary based on factors, such as the cost of rebalancing, market conditions, etc.

The target portfolio, i.e., data regarding the target portfolio, of the investment portfolio identified as a candidate for rebalancing may then be retrieved at 110, e.g., from an investment portfolio database. As noted above, the target portfolio may be defined with regard to the allocation of particular types of securities. In this instance, the target portfolio data set includes data regarding the allocation of securities. In one embodiment, the target portfolio is defined in terms of particular securities. In this instance, the target portfolio data set includes a securities identifier, quantity, etc. For example, the target portfolio may be defined to include 35 shares of A corp. stock, 100 shares of B, 17 of D, 66 of E, of 21 F, and 100 of M. The target portfolio may be expressed as a vector with each of its elements representing the number of shares of the according stock position, as shown in Table A.

TABLE A

| A | B | D | E | F | M | O |
|---|---|---|---|---|---|---|
| 35 | 100 | 17 | 66 | 21 | 100 | 0 |

The actual investment portfolio or stock position data may then be retrieved at 112, e.g., from an investment portfolio database, and may similarly be expressed as a vector. For example, the investor's position with regard to the actual investment portfolio may include 42 shares of D corp. stock, 66 of E, 21 of F, 116 of M, and 43 of O, as represented in Table B.

TABLE B

| A | B | D | E | F | M | O |
|---|---|---|---|---|---|---|
| 0 | 0 | 42 | 66 | 21 | 116 | 43 |

A difference portfolio may then be calculated or otherwise determined at 114. The difference portfolio is generally the difference of particular securities, e.g., shares, between the target portfolio and the actual investment portfolio, which may also be expressed as a vector, as shown with regard to the above examples in Table C. The difference portfolio generally contains positive and negative elements. The positive elements indicate securities to be purchased and the negative elements indicate securities to be sold. This aspect of the invention generally identifies at least one security to be sold during rebalancing, e.g., in accordance with a rebalancing strategy. For instance, the negative element with regard to D securities indicates that 25 shares of D securities are to be sold to achieve the desired allocation with regard to the target portfolio.

TABLE C

| A | B | D | E | F | M | O |
|---|---|---|---|---|---|---|
| +35 | +100 | −25 | 0 | 0 | −16 | −43 |

An ideal or optimal security or basket of securities to be sold from the investment portfolio may then be identified at 140 in a manner to manage the investor's exposure to short-term capital gains or losses. The ideal security or basket of securities may be identified from one or more tax lots, or a portion of a tax lot of the particular security holding. In one embodiment, the ideal or optimal security or basket of securities to be sold is identified by allocating the securities to be sold at 116 to the investment portfolio's tax lot or lots, and computing at 118 an implied short-term gain/loss ("STGL"). Tax lots generally represent recorded transactions with regard to the investment portfolio securities. Further with regard to the above examples, Table D shows tax lot information for the securities: A, B, D, E, F, M, and O securities at times T1 to T3. It can be seen, for instance, that 10, 13, and 19 shares of D securities were purchased at times T1, T2, and T3, respectively.

TABLE D

|   | T1   | T2       | T3       |
|---|------|----------|----------|
| A | +22  | +17 (39) | −39 (0)  |
| B | 0    | 0        | 0        |
| D | +10  | +13 (23) | +19 (42) |
| E | 0    | 0        | +66 (66) |
| F | +42  | 0 (42)   | −17 (21) |
| M | +130 | 0 (130)  | −14 (116)|
| O | +33  | 0 (33)   | +10 (43) |

It is understood that securities may be identified for sale from the investment portfolio tax lots in accordance with various strategies. For instance, the negative securities may be allocated according to FIFO where securities are selected beginning with the earliest or farthest tax lots and proceeding to the later tax lots. For example, 25 shares of D securities may be sold out of the T1-T3 tax lots beginning with the 10 shares of the T1 tax lot, proceeding to the 13 shares of the T2 tax lot and to 2 shares of the T3 tax lot. Alternatively, or in addition, the negative securities may be allocated beginning with the tax lots having the highest cost basis proceeding to the tax lots with the lower cost basis. In one embodiment, the securities to be sold are identified by randomly allocating the negative securities from the difference portfolio to the various tax lots. In this instance, a plurality of allocations with regard to the negative securities are preferably performed by random selection and the implied STGL computed for each random allocation. In this instance, the ideal or optimum security or basket of securities to be sold from the investment portfolio tax lot or lots is, in one embodiment, the random allocation embodiment that produces the most appropriate result given the investors objectives and constraints, such as the allocation that results in an implied STGL closest to zero or closest to a desired or targeted capital gain or loss, least portfolio drift or tracking error, beta, aggregated long term gains, or a combination thereof.

In one embodiment, the computed implied STGL is a net or aggregate STGL, i.e., the sum of the implied STGL for each negative security of the difference portfolio, rather than the STGL for the individual negative securities. In another embodiment, the implied STGTL is applied to the running year's total STGL ("TSTGL") at 120 to produce an implied TSTGL. With regard to the embodiment employing a random allocation of the negative securities, a net STGL and implied TSTGL is computed for each of the random allocations, and the ideal or optimum security or basket of securities to be sold from the investment portfolio tax lot or lots is, the allocation that results in the smallest implied net STGL or TSTGL. In one embodiment, the implied TSTGL is expressed in terms of a fraction of the investment portfolio's net securities.

The implied STGL, e.g., the individual, net STGL, or TSTGL, for the identified ideal security or basket of securities may them be compared with a pre-set rebalancing threshold or constraint for shorter term capital gains, such as a constraint with regards to STGL, net STGL, TSTGL, etc., which may be specified by either the investor or the asset management company. The threshold may be defined in various ways, such as with a lower limit, upper limit, absolute value, etc. Thus, if at 122 the implied STGL, or with regard to the random allocations, at least one implied STGL, such as the random tax lot allocation which moves the resulting implied STGL closest to zero or smallest STGL, is within the threshold, e.g., +/−2%, the investment portfolio may be rebalanced at 124. In one embodiment the portfolio is only rebalanced if the implied TSTGL is closer to zero than the actual TSTGL. In another embodiment, the portfolio is only rebalanced if the actual TSTGL is between about +/−2% or between about +/−1%.

Otherwise, the system will block or defer at 128 rebalancing of the investment portfolio, and may proceed to monitor the investment portfolio accordingly for rebalancing. Even if neither the market values nor the target portfolio has changed in the interim between the previous assessment for rebalancing the investment portfolio, other conditions for rebalancing may have changed, such as a chance in the tax status of an asset from short-term to long-term.

In some instances, the portfolio drift from the target allocation may be sufficiently large to warrant rebalancing the investment portfolio and accepting the cost associated with the STGL or TSTGL exceeding the rebalancing threshold. In this instance, if portfolio drift exceeds a maximum portfolio drift the investment portfolio is rebalanced at 126 regardless of the resultant TSTGL.

As noted above, various liquidation strategies may be applied to liquidate negative securities from the difference portfolio. Various simulations have been run on a simulated investment portfolio that is based on historical data derived from the LBS Global Asset Management Large/Intermediate Cap portfolio between 1993-2002 to determine the result of the present invention on the investment portfolio's rate of return. The simulated investment portfolio has an initial value of $100,000. The following four liquidation strategies have been simulated: FIFO without constraints ("FNC"), FIFO with constraints ("FWC"), specific identification based on random allocations without constraints ("SNC"), and specific identification based on random allocations with constraints ("SWC"). Constraints generally refers to limiting the occurrence of rebalancing based on a liquidation strategy that blocks or otherwise defers rebalancing based on a constraining variable, such as short-term capital gains.

FIFO Without Constraints (FNC)

Figure 3:
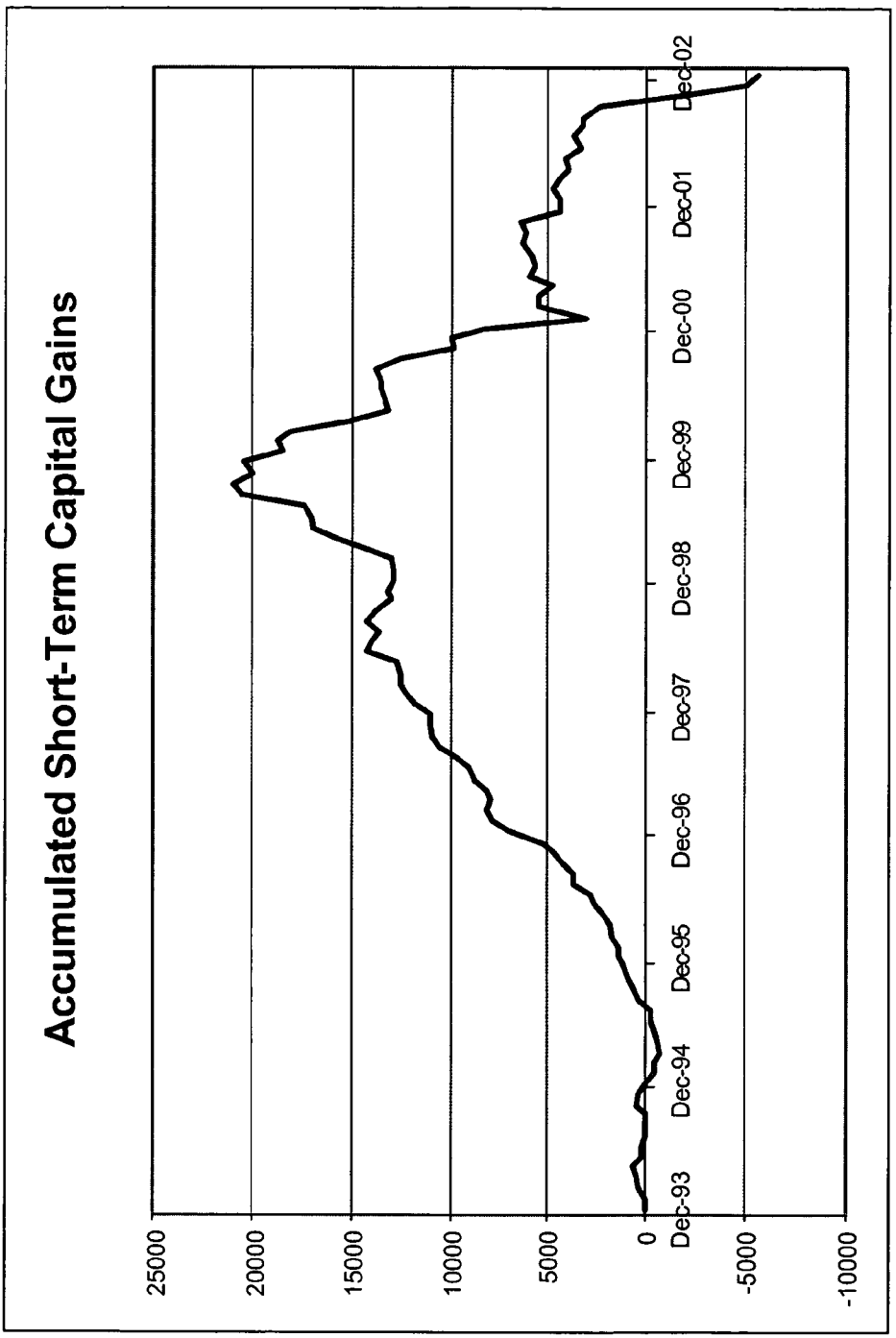
Figure 4:
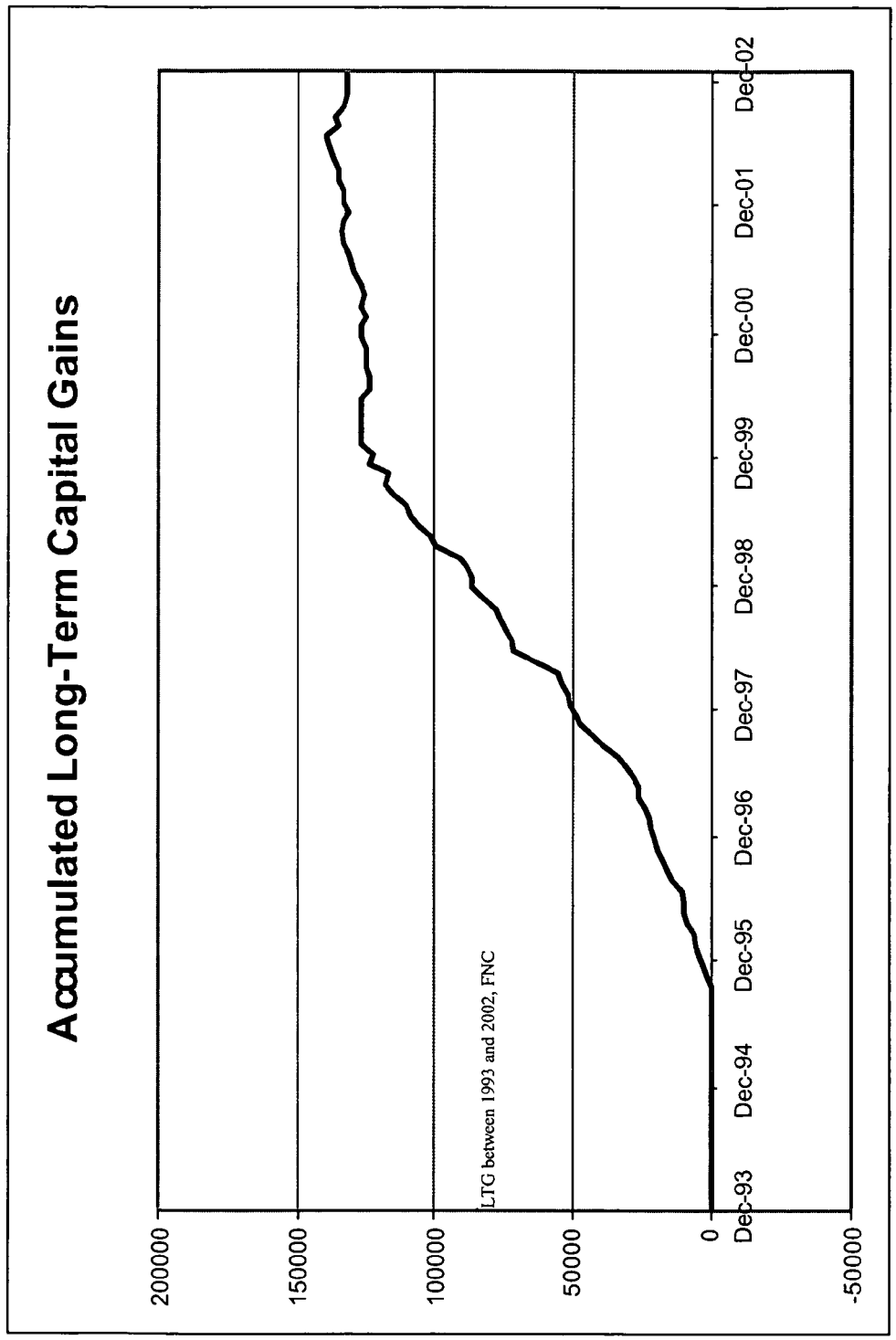
Figure 5:
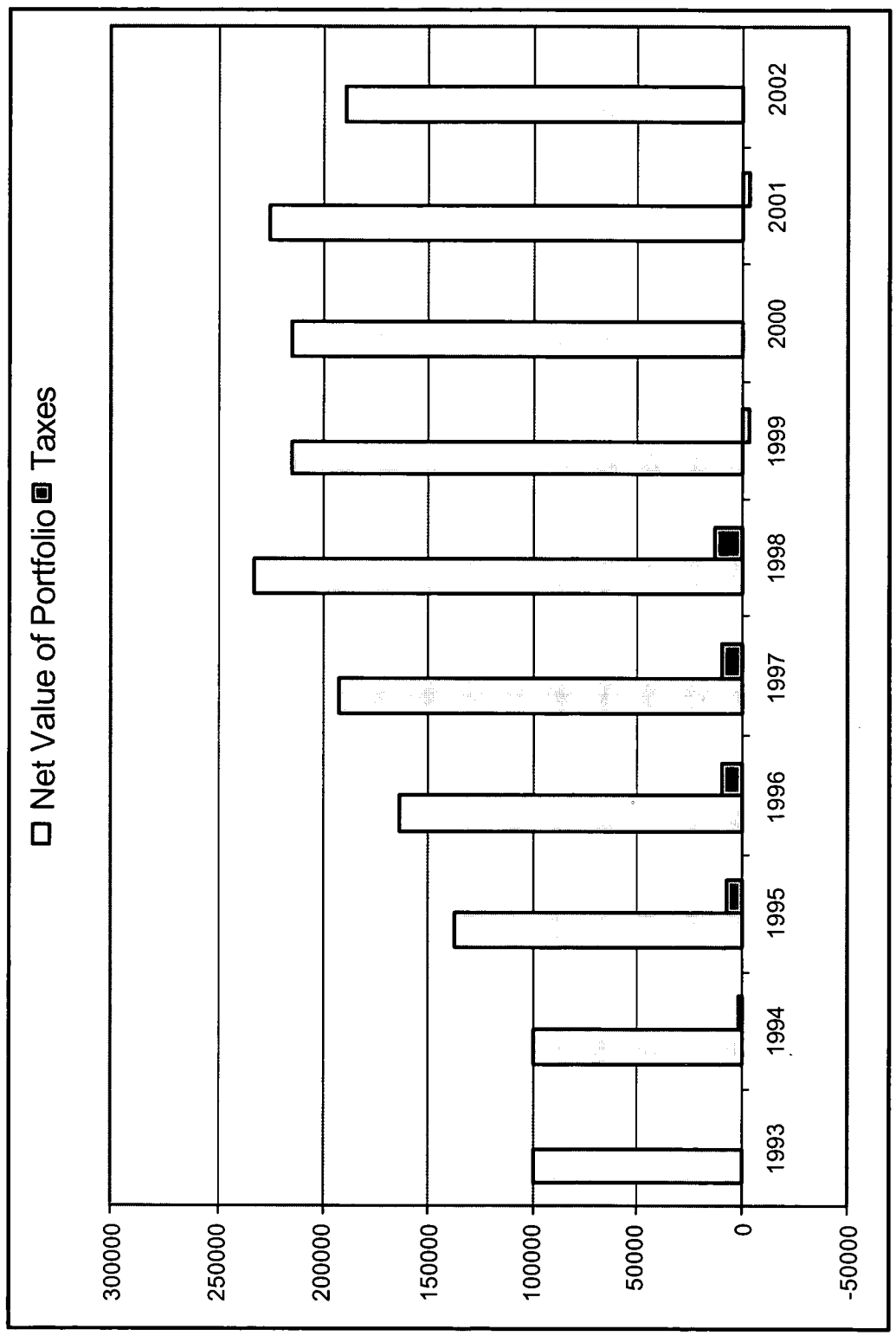

If the liquidation strategy is a FIFO and all positions are consequently implemented as suggested, i.e., without constraints, the cumulative short-term gains (STG) and long-term gains (LTG) are shown in FIG. 3 and FIG. 4, respectively, which translates into the net year-end portfolio asset values ("NAVs") and annual taxes as shown in FIG. 5. The final NAV is $190,321 and the total tax paid is $42,852. Both the cumulative STG and the cumulative LTG are of significant size. As it is the objective to realize capital gains at some time, LTG is less important issue at this stag. Our primary concern is STG which is taxed at a much higher rate but can be easily converted into LTG by waiting the according time for the tax rate switch to happen. Moreover, short-term losses (STL) can be carried forward but not back which is a significant constraint of the investor's flexibility. Hence, big and lengthy swings as shown in FIG. 3 are not recommended, as they are likely to catch the investor off-guard. If an investor wants to liquidate his entire portfolio if the STG aggregation is substantial, he may run out of offsetting options. As a result, we target an STG-function with frequent swings of a small magnitude.

FIFO, With Constraints (FWC)

Figure 6:
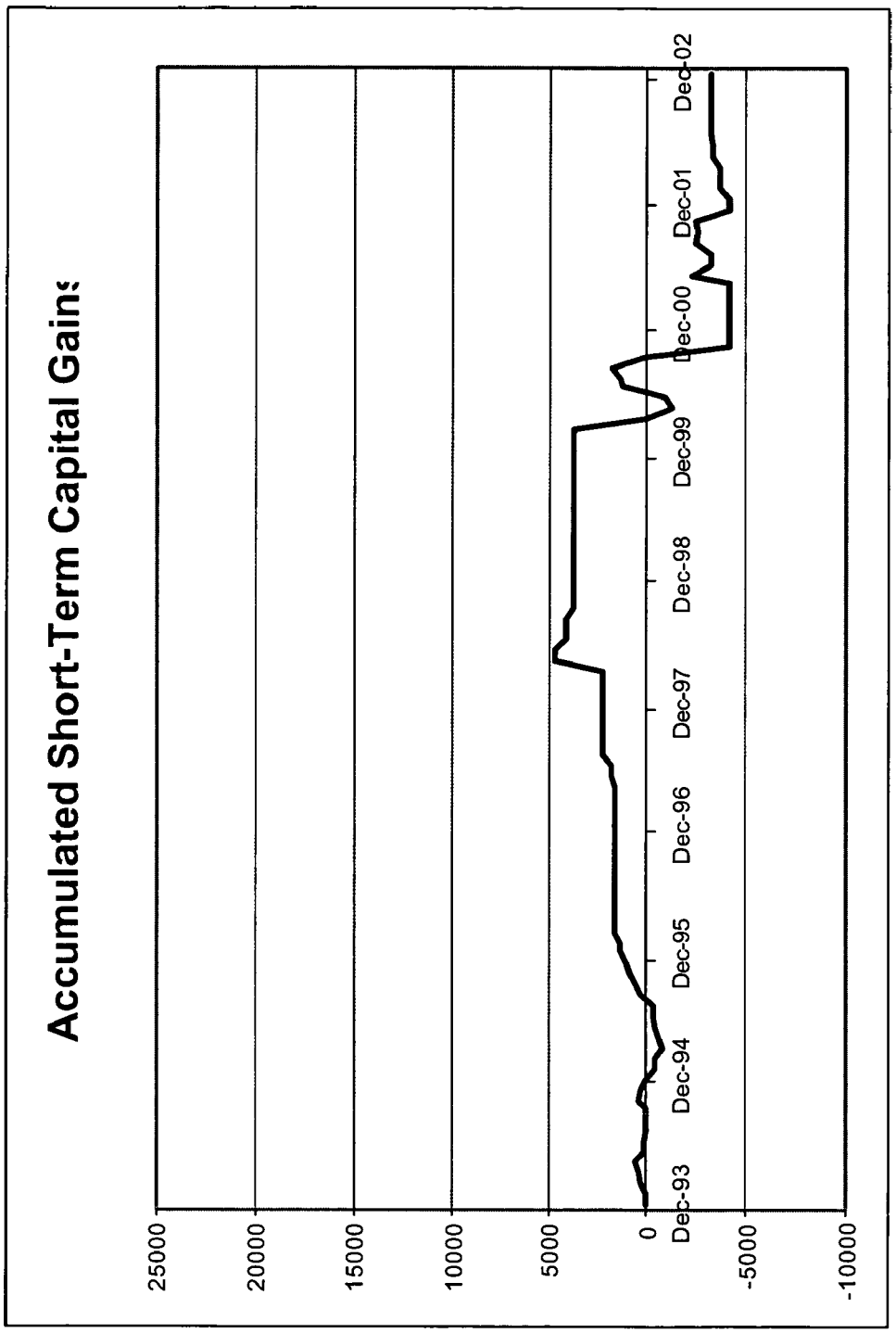
Figure 7:
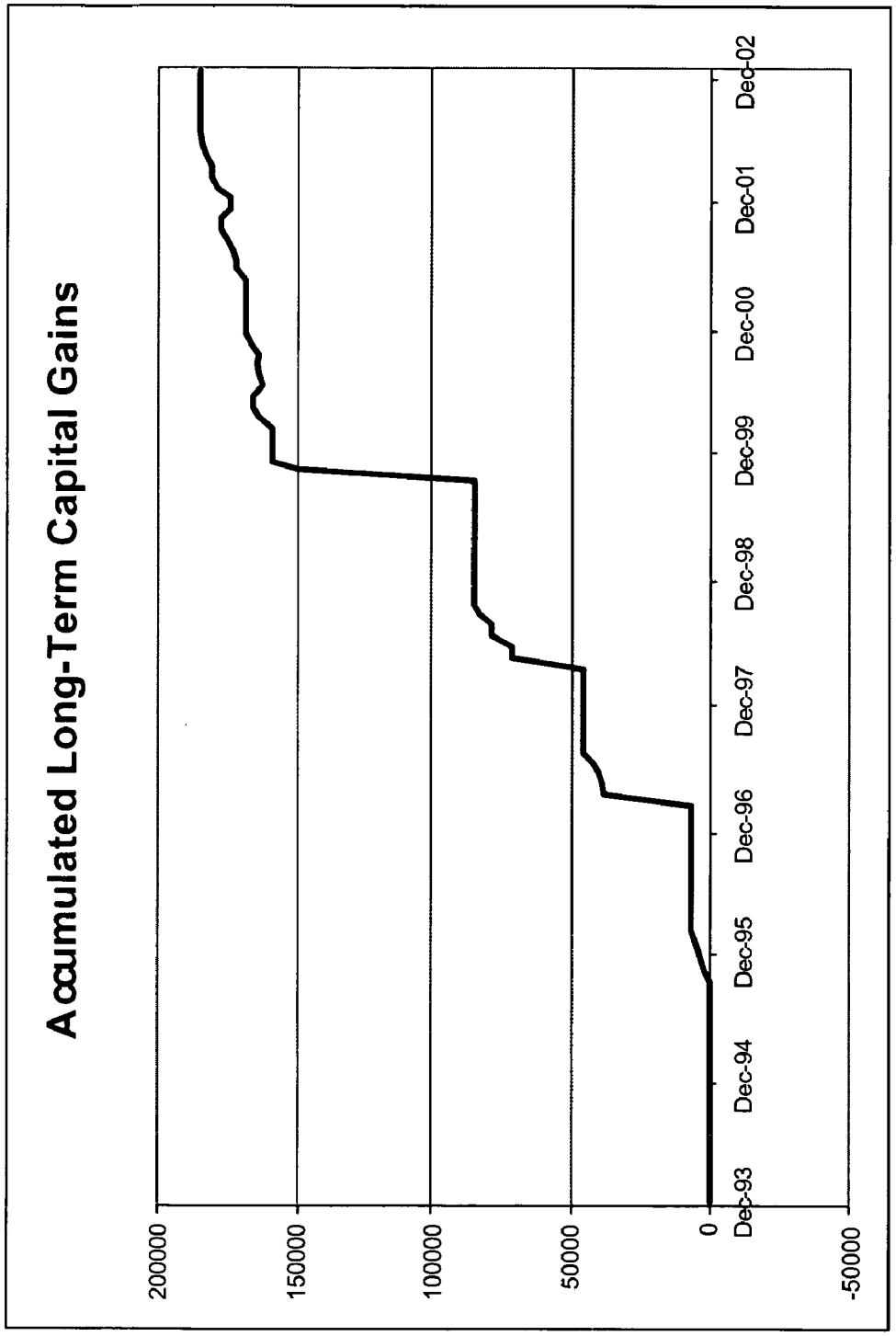
Figure 8:
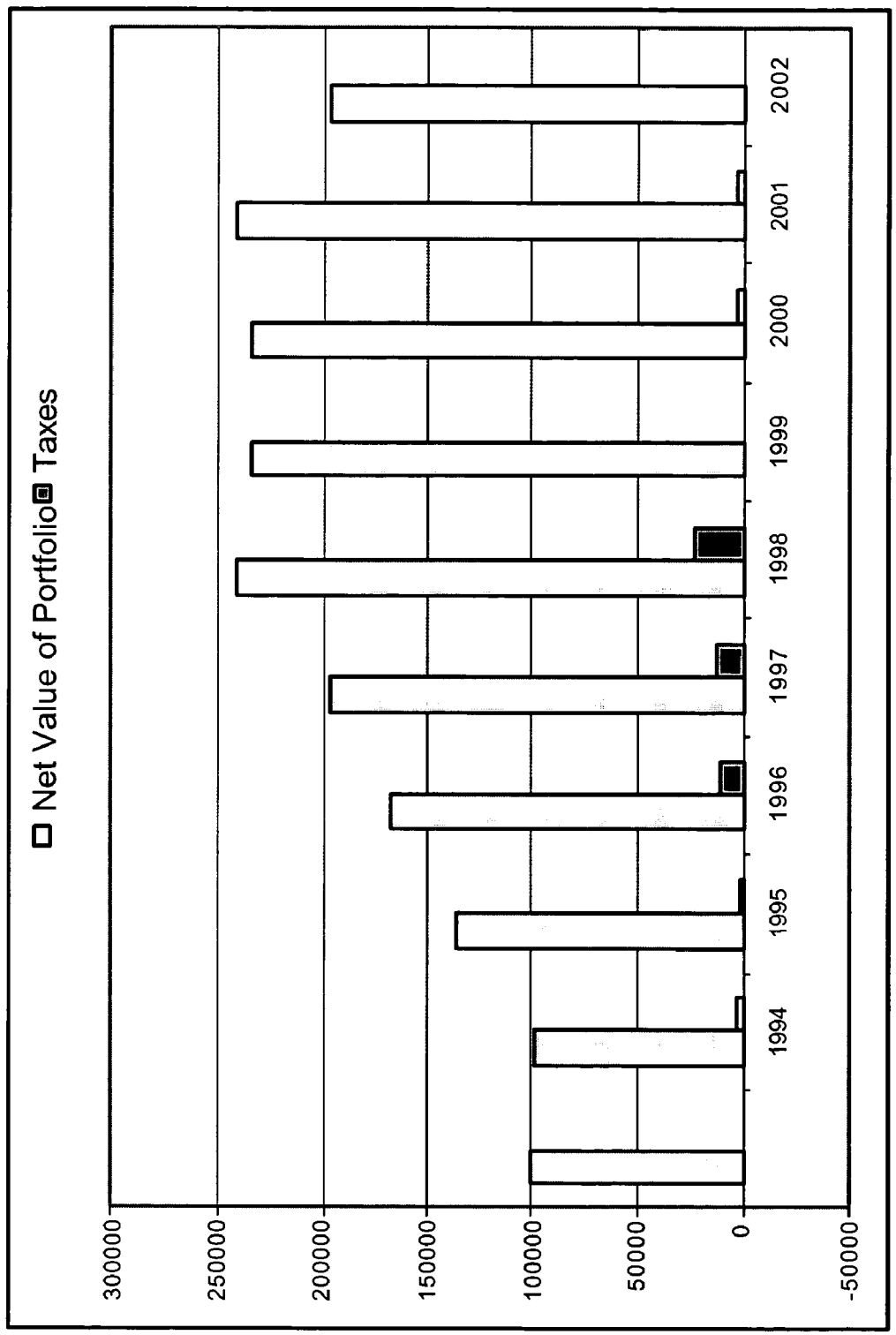
Figure 9:
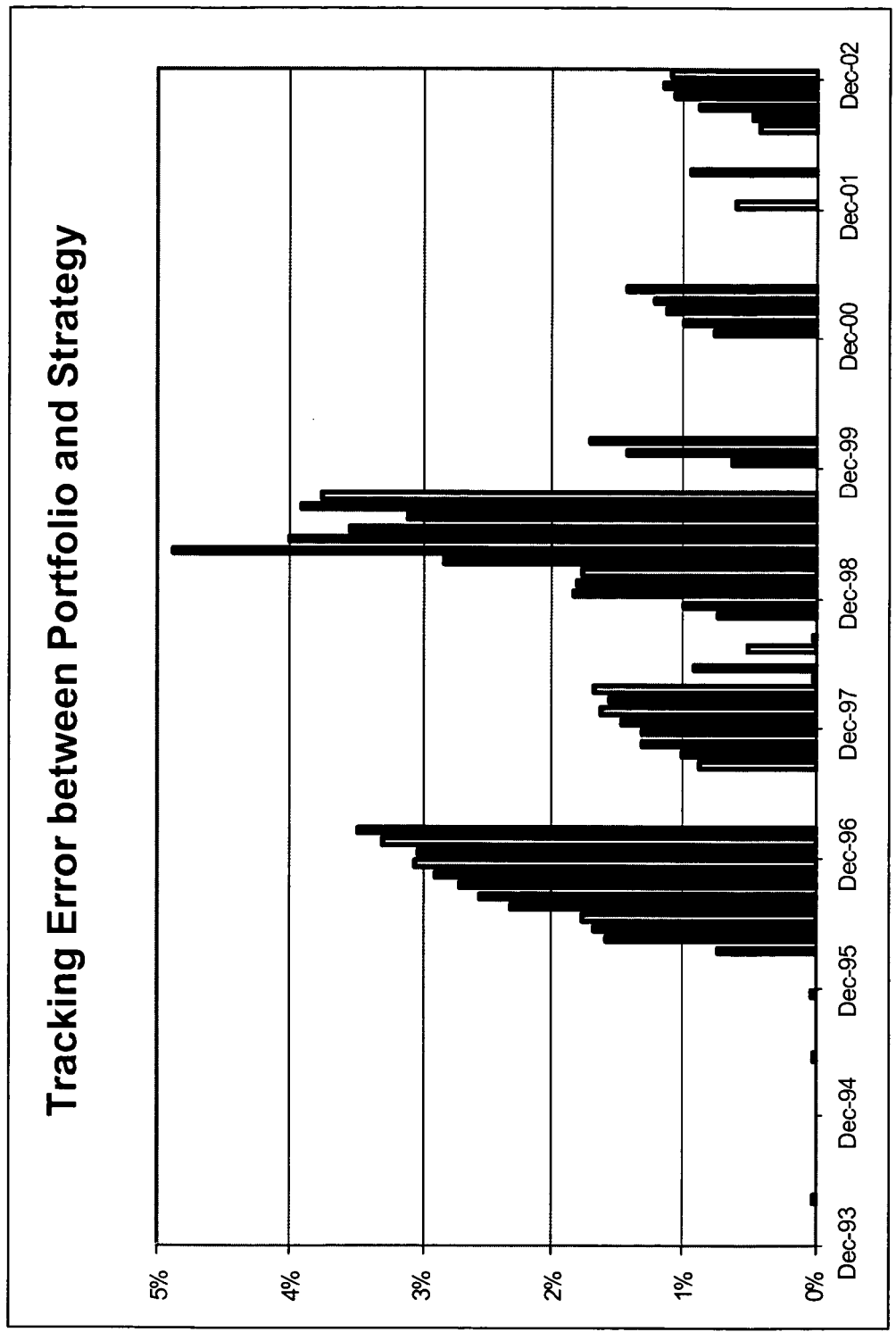

The same process as in FIFO was applied with the sole difference that portfolio flows are suspended if this resulted in a STG aggregation larger than ±2% of the portfolio value. Applying this rule, the STG and LTG are shown in FIG. 6 and FIG. 7, respectively. In this instance, STG is under control as its maximum value is four times smaller than in the previous approach. Again, due to the surge in the stock market, LTG increases significantly over time, but this time, it does so stepwise, since rebalancing is suspended several times due to the 2% rule. This translates into the year-end NAVs and annual taxes as shown in FIG. 8. The final NAV is $196,630 and the total tax paid is $55,529. The cost of suspending or forgoing rebalancing is a proxy tracking error ("PTE") between the target portfolio and the actual portfolio, which is shown in FIG. 9.

SI Without Constraints (SNC)

Figure 10:
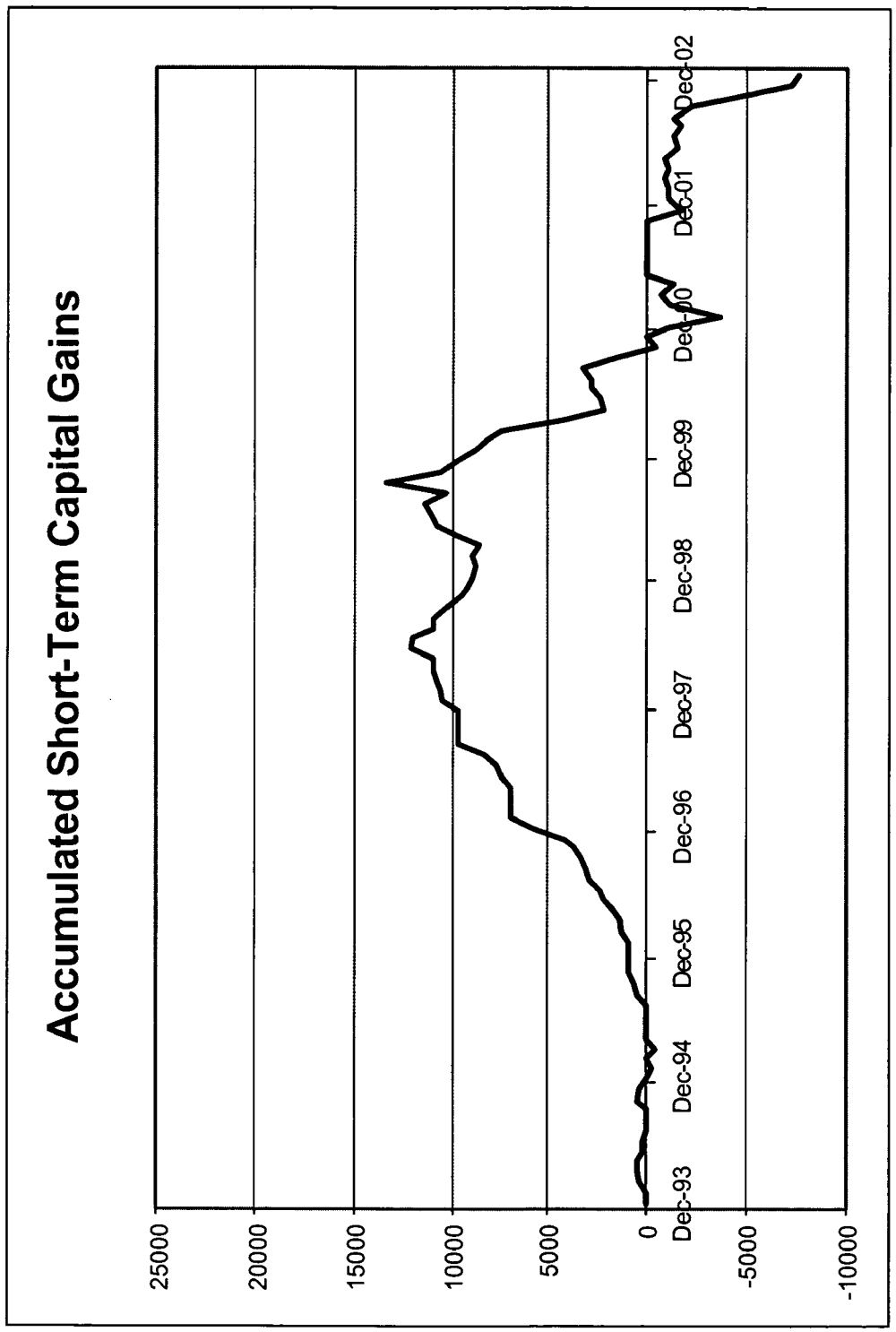
Figure 11:
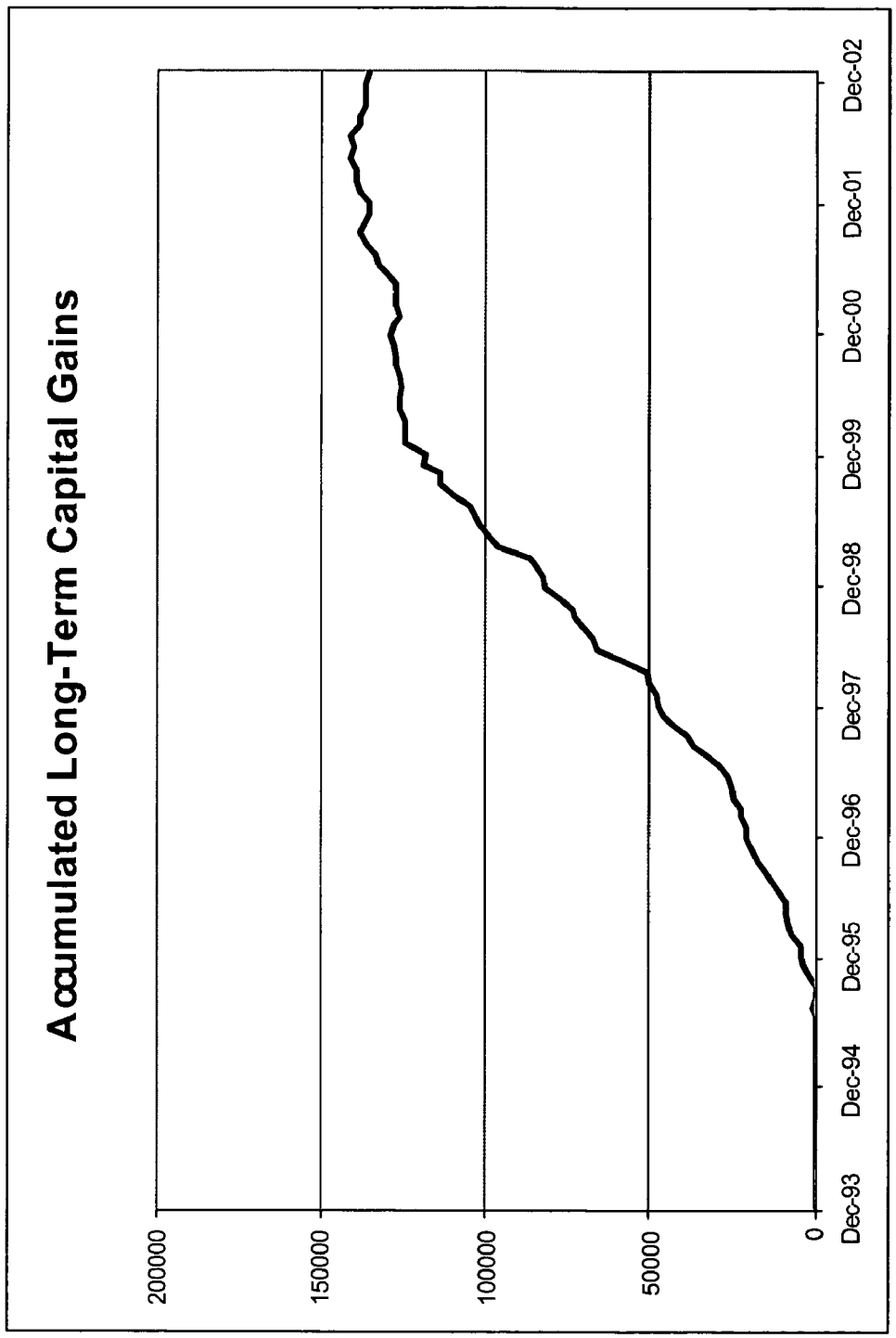
Figure 12:
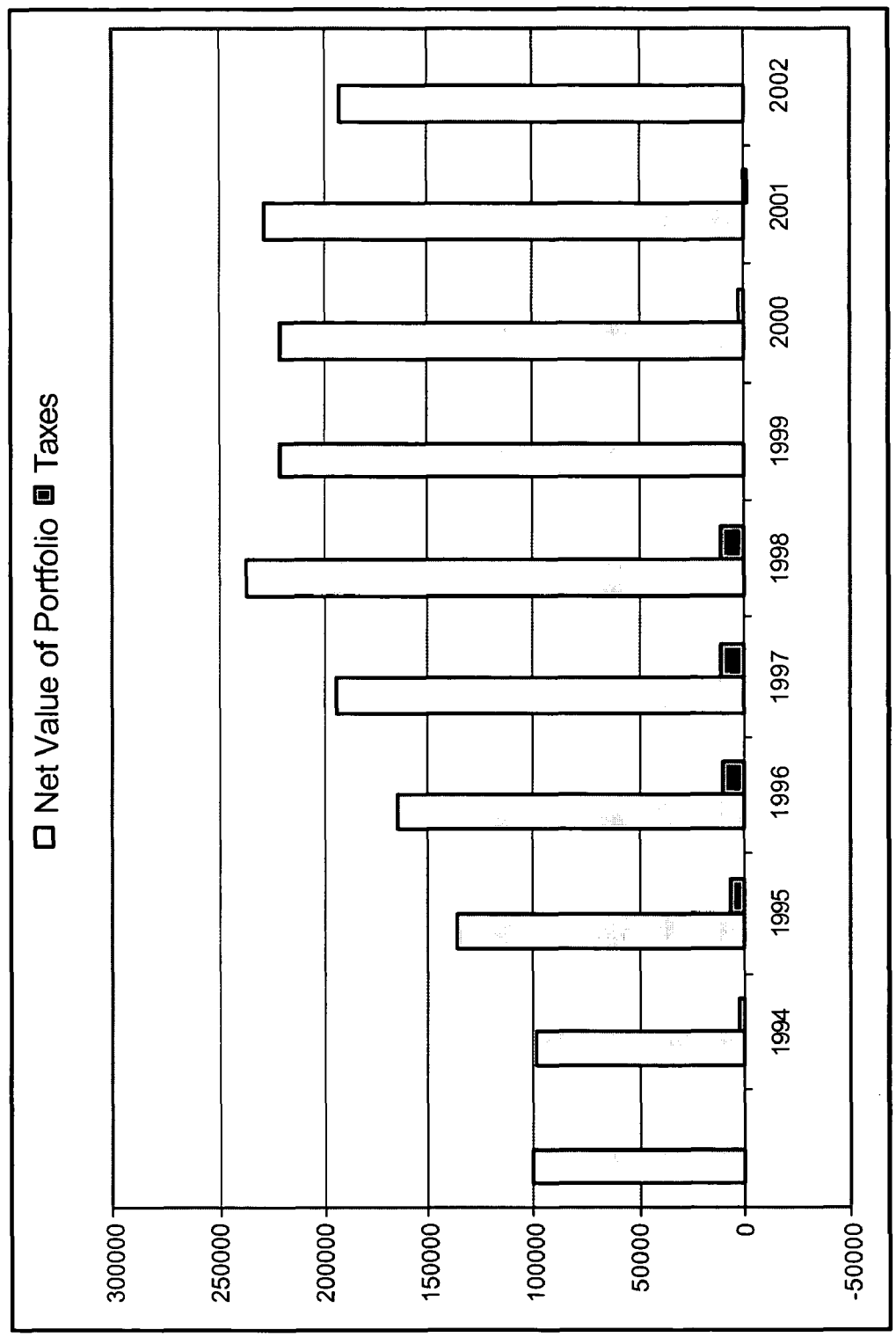

In this instance, the liquidation process calls for specific identification of securities by tax lot based on random allocations or permutations without constraints with the STG, LTG, and NAVs and taxes, as shown in FIG. 10, FIG. 11, and FIG. 12, respectively, and all portfolio changes are consequently implemented as suggested. The final NAV is $192,646 and the total tax paid is $41,045.

SI With Constraints (SWC)

Figure 13:
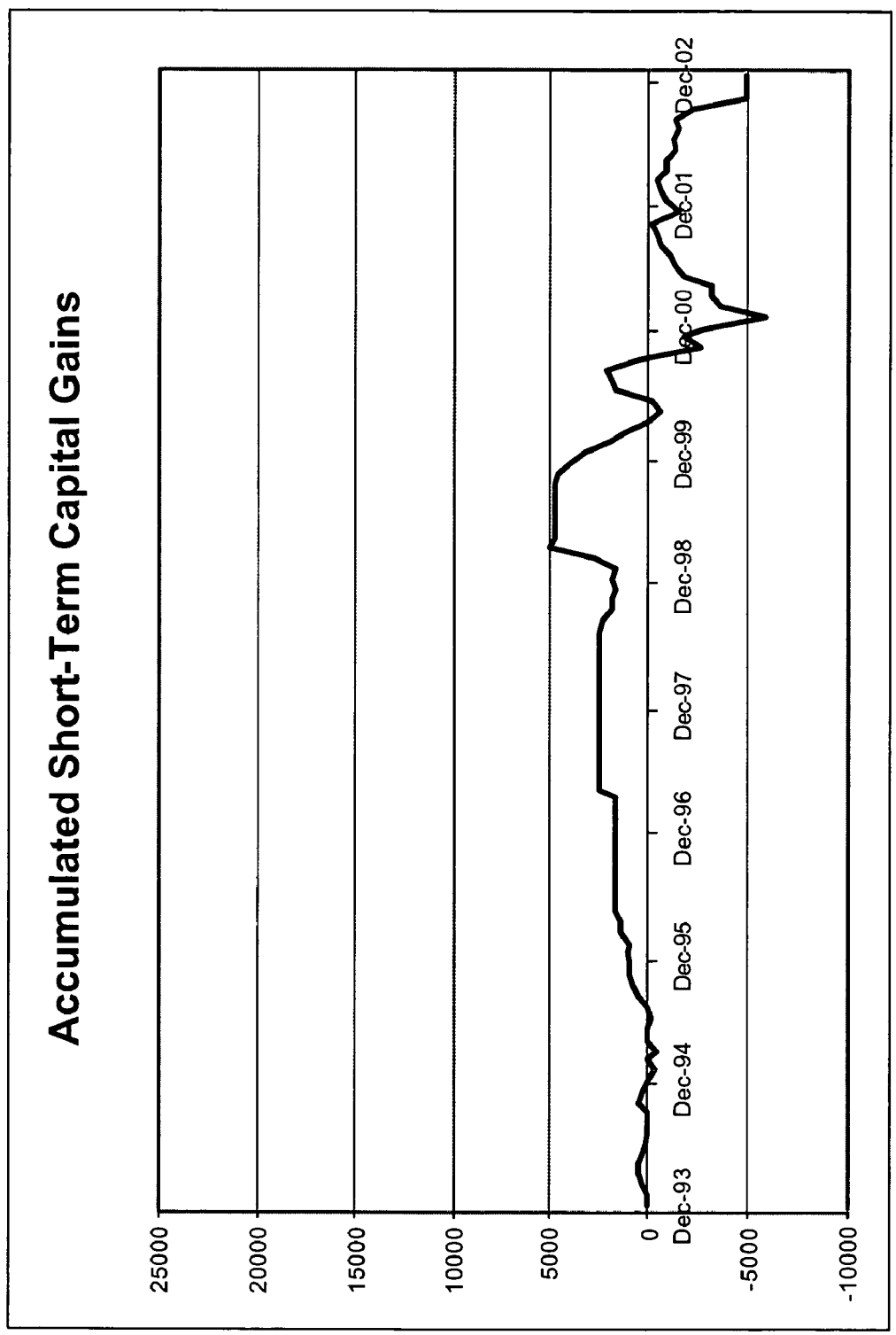
Figure 14:
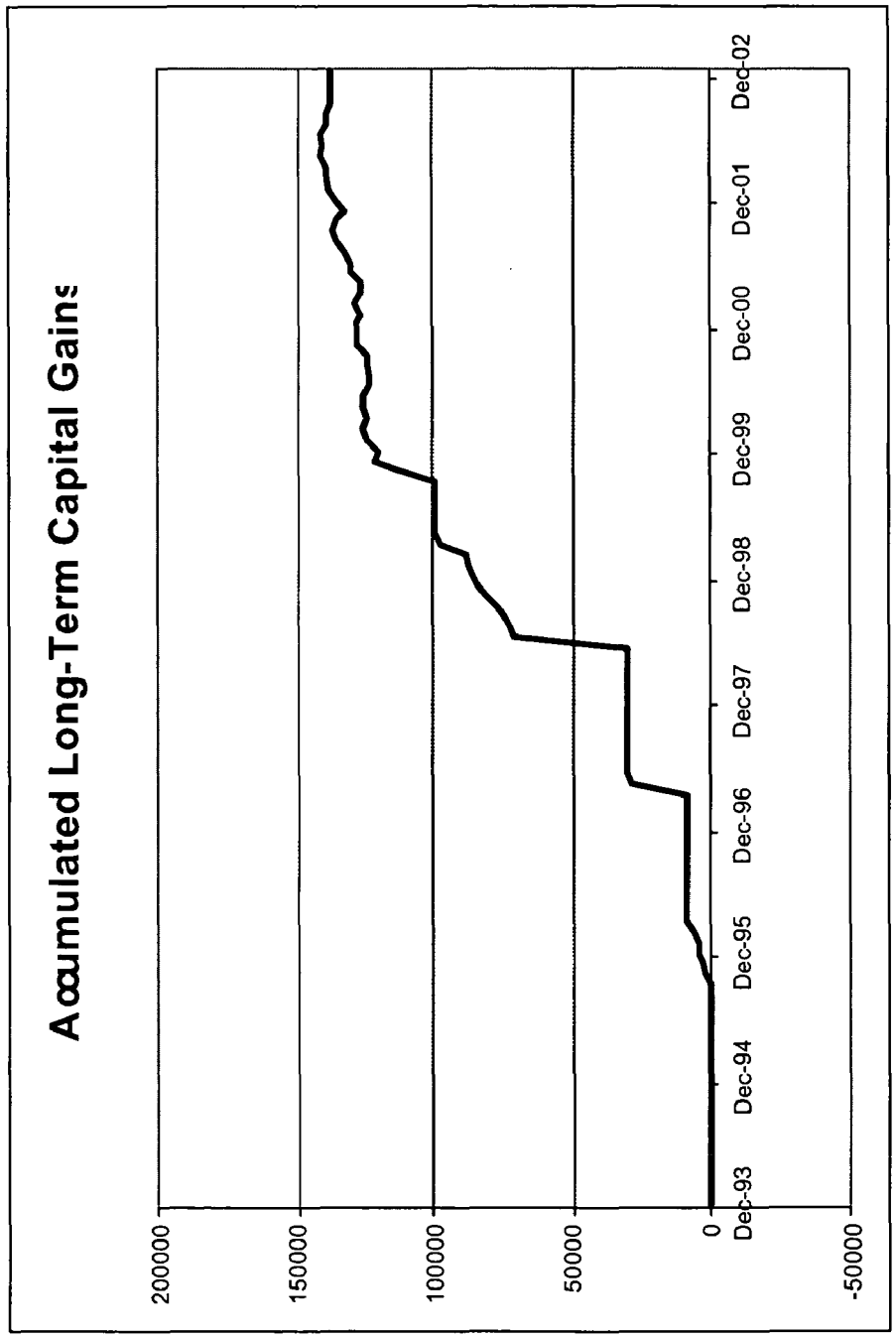
Figure 15:
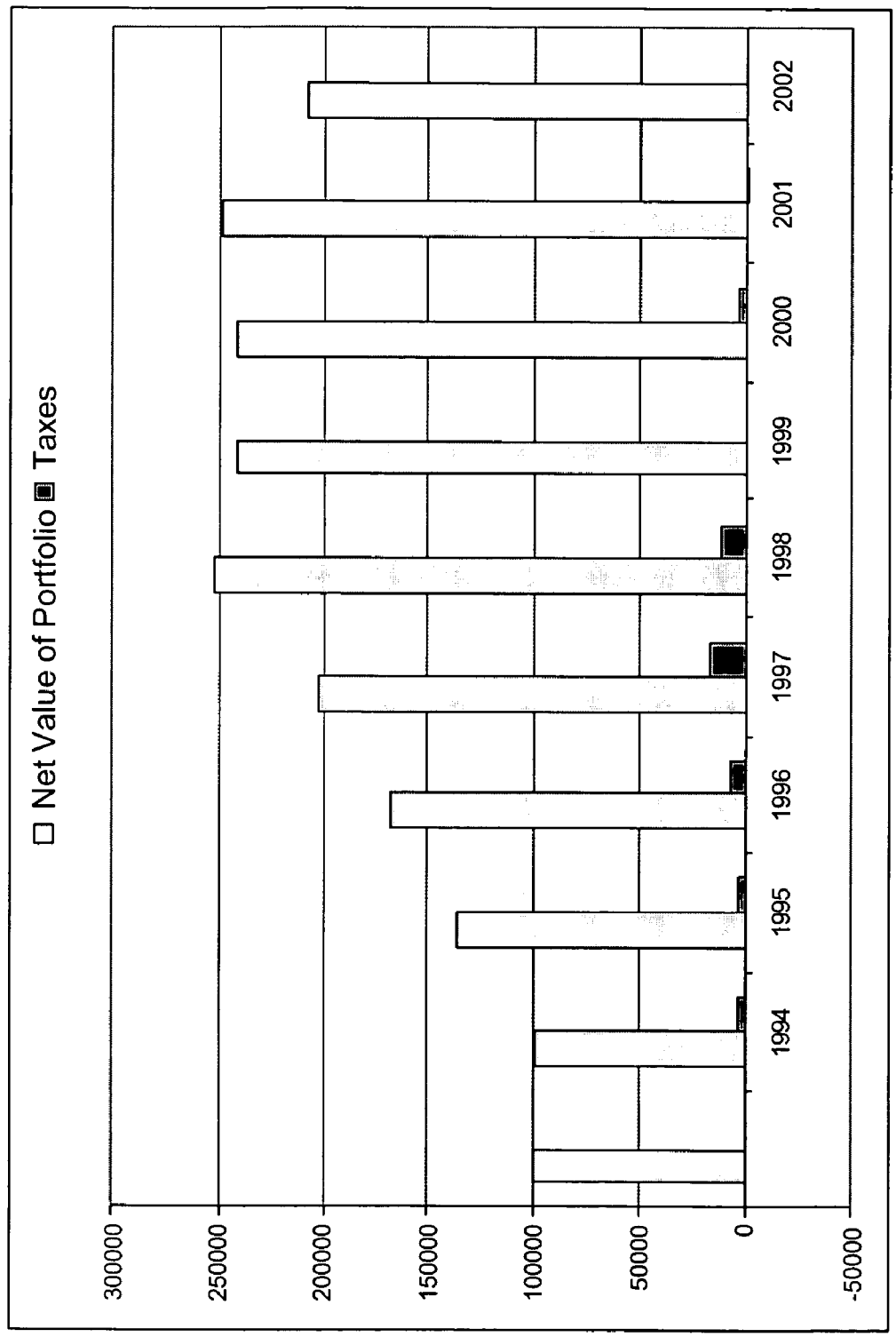
Figure 16:
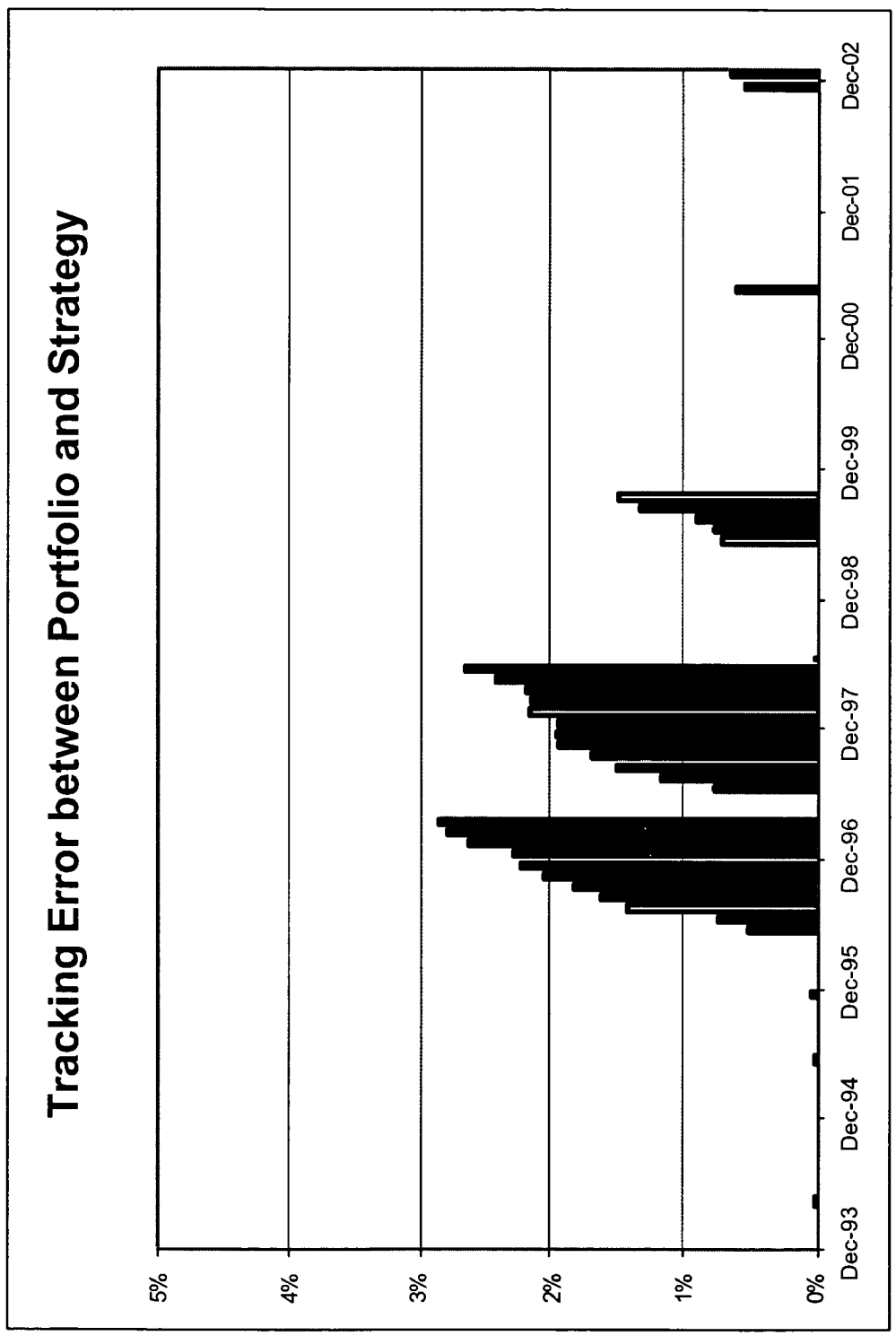
Figure 19:
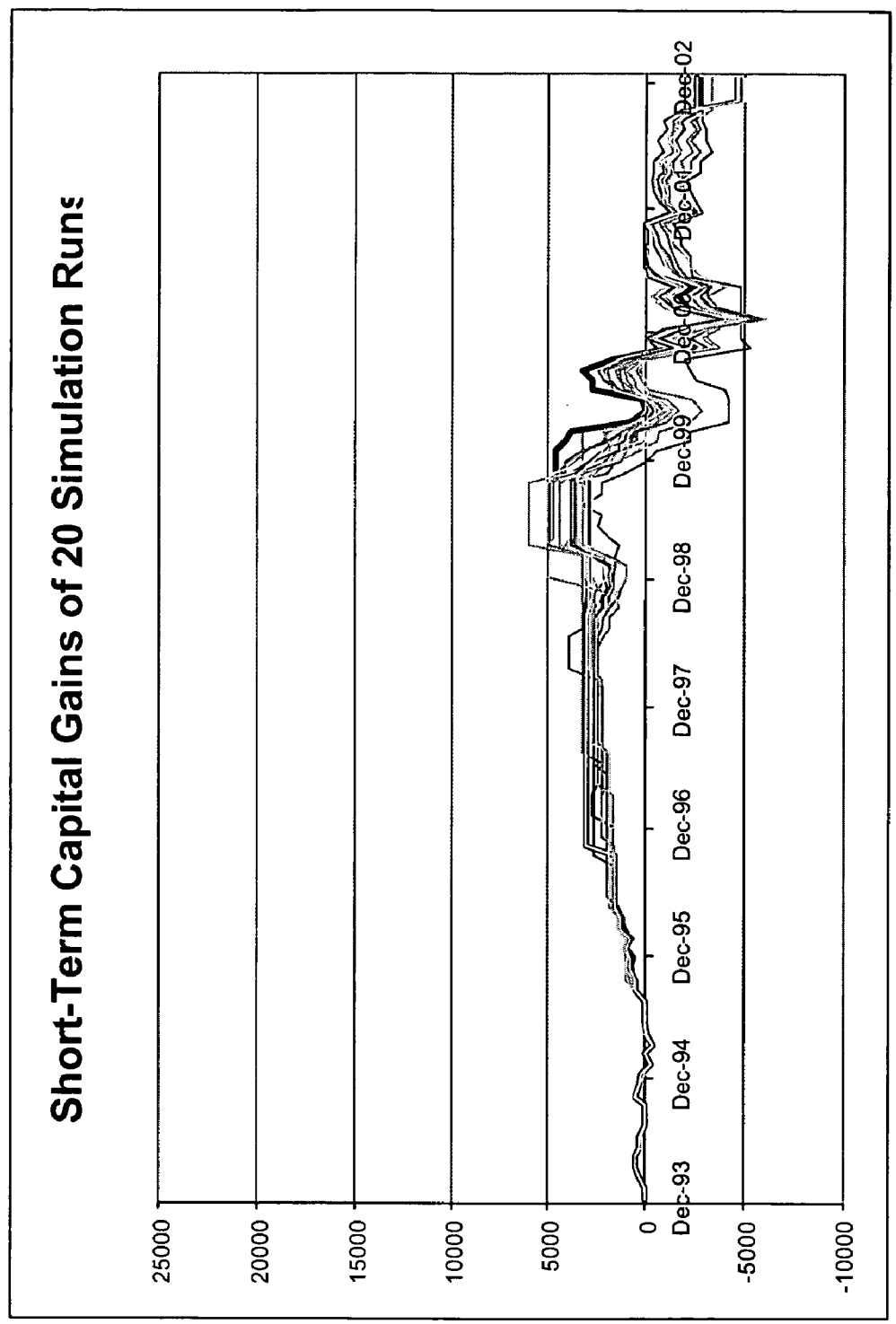
Figure 20:
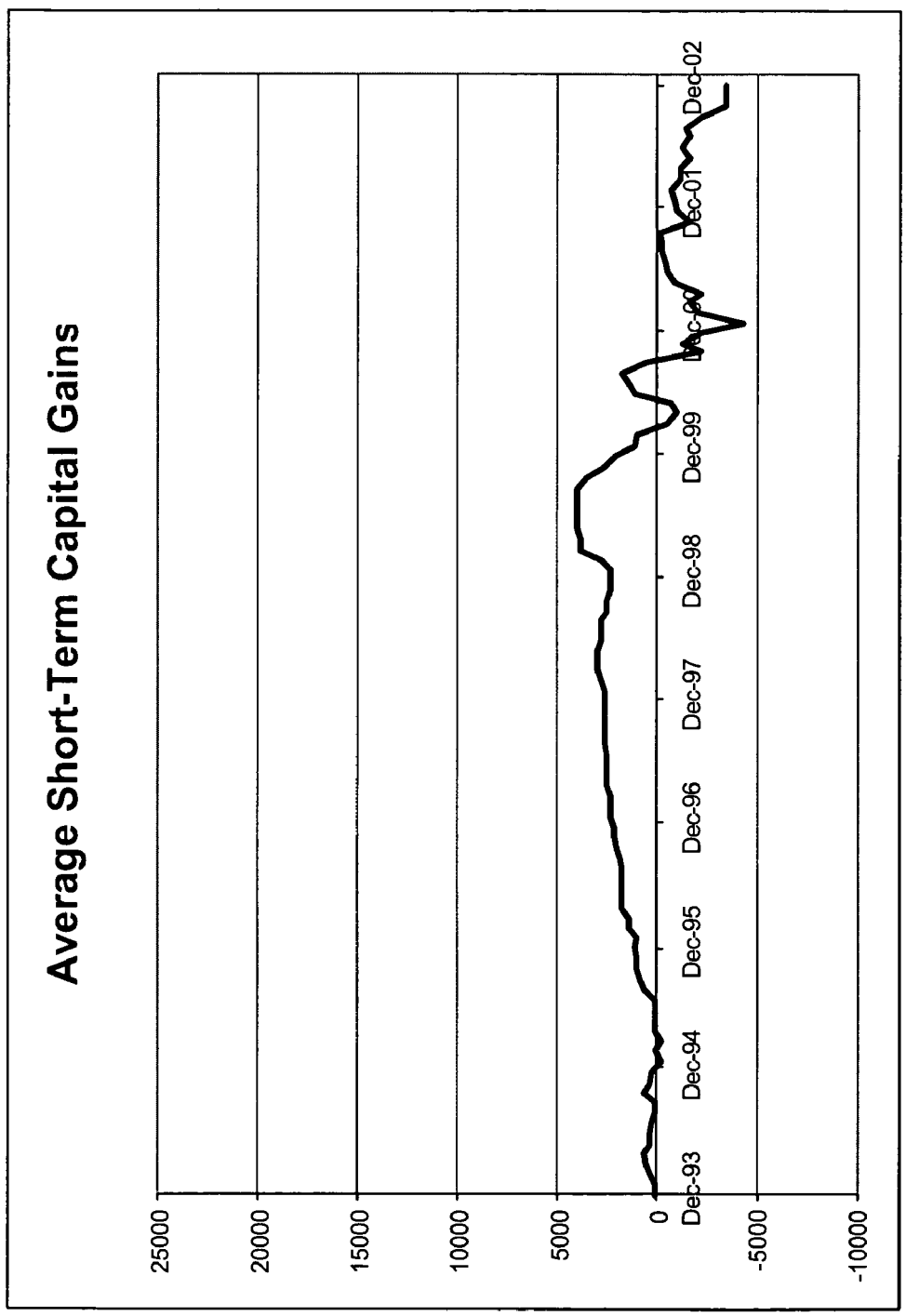
Figure 21:
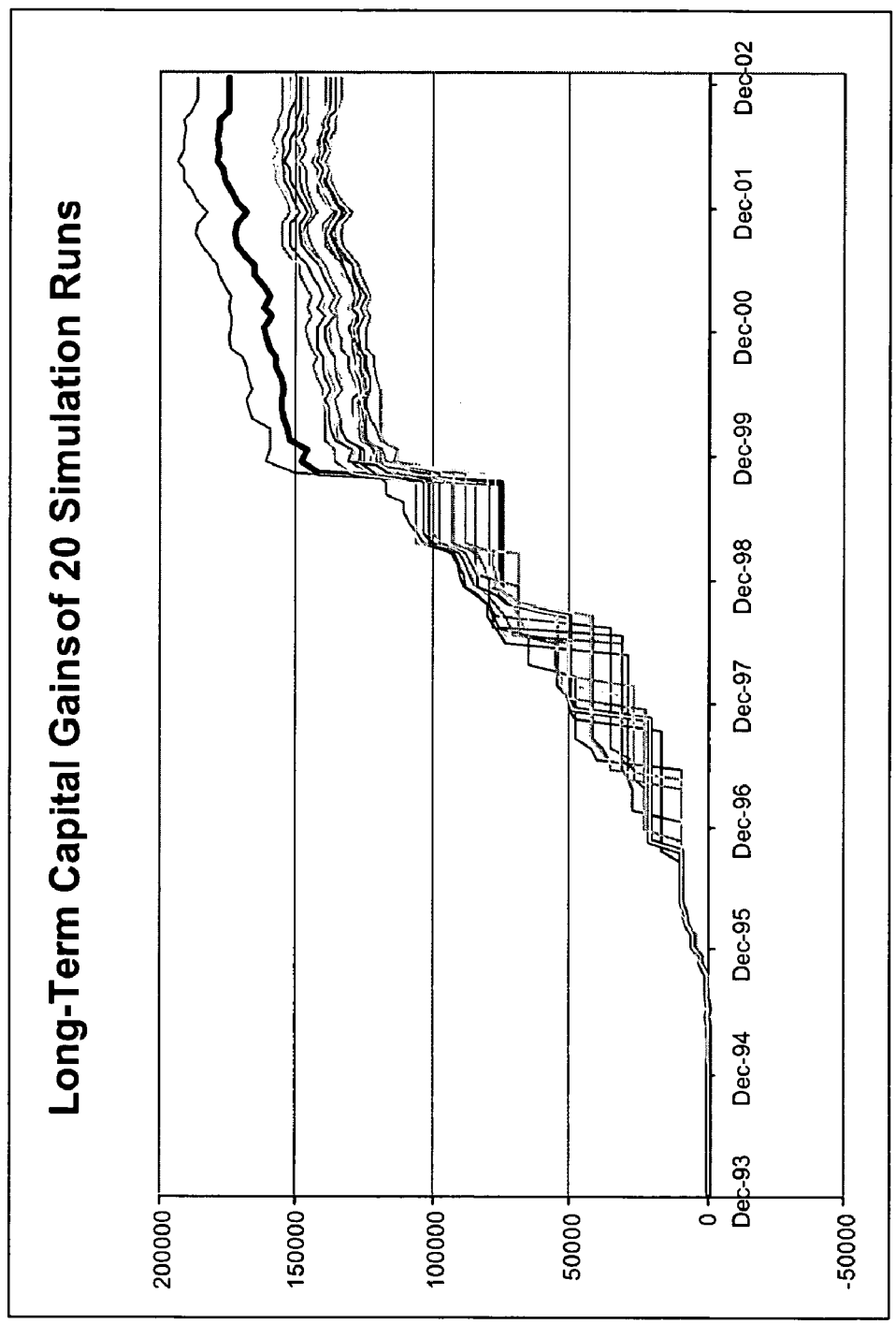
Figure 22:
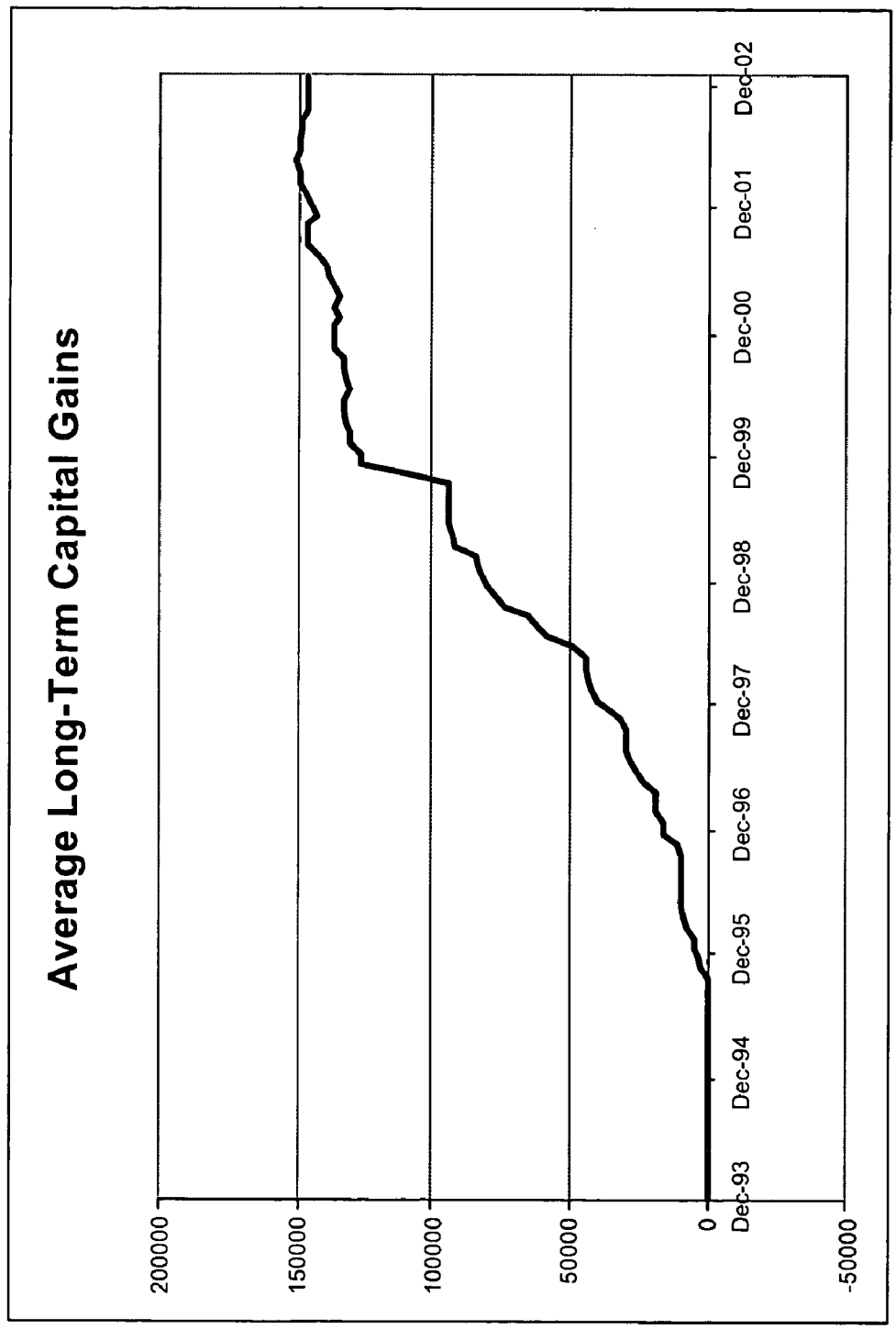
Figure 23:
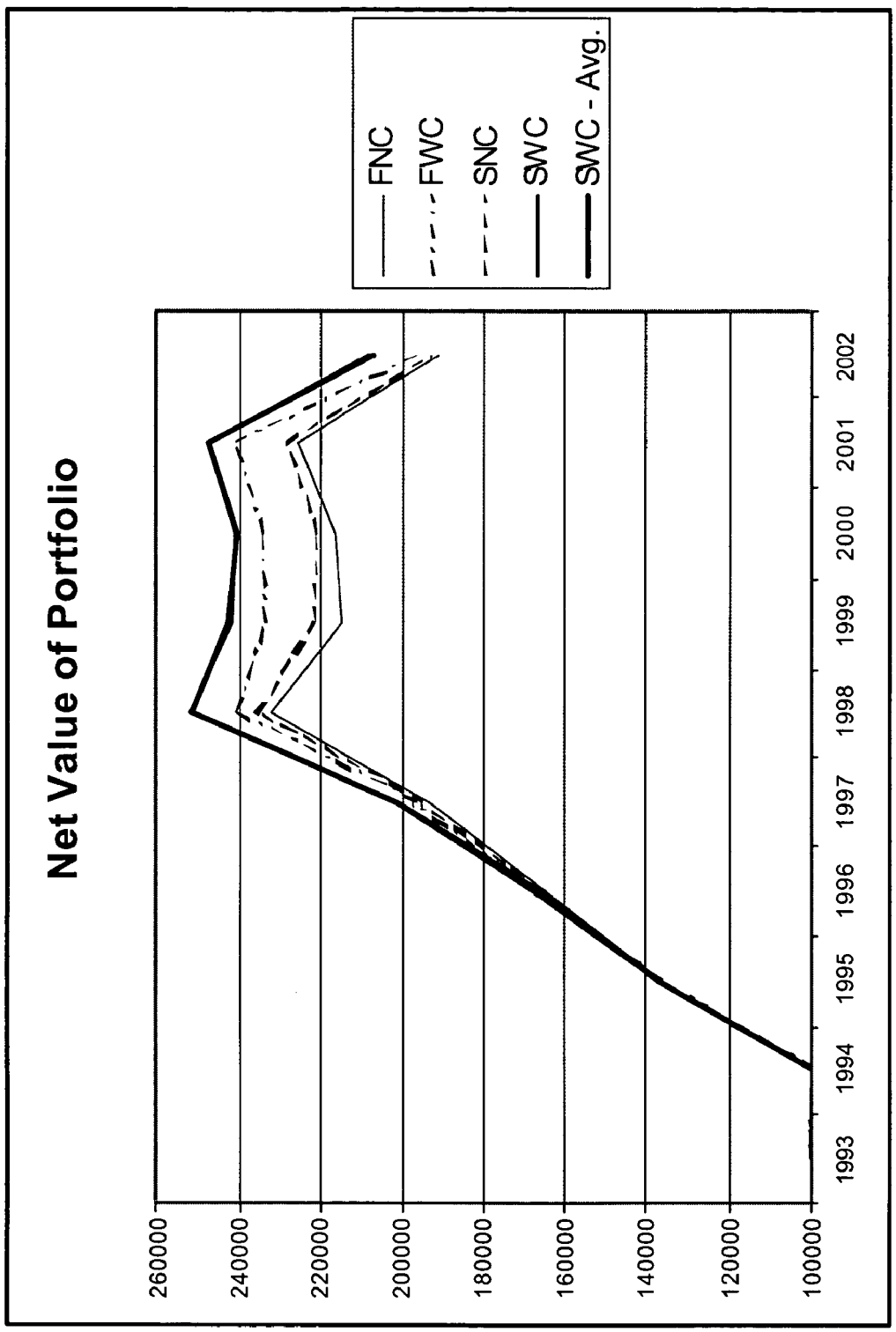
Figure 24:
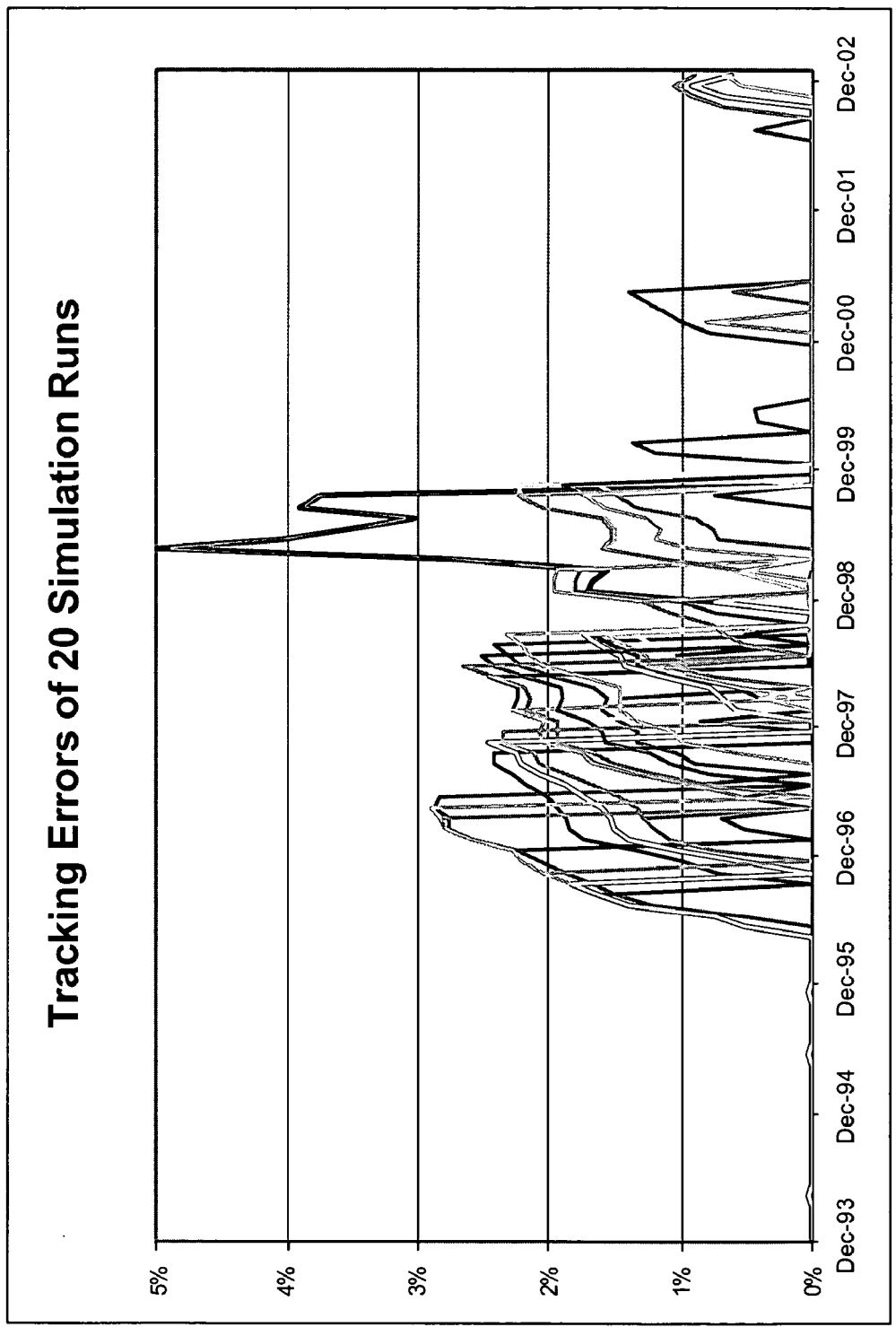
Figure 25:
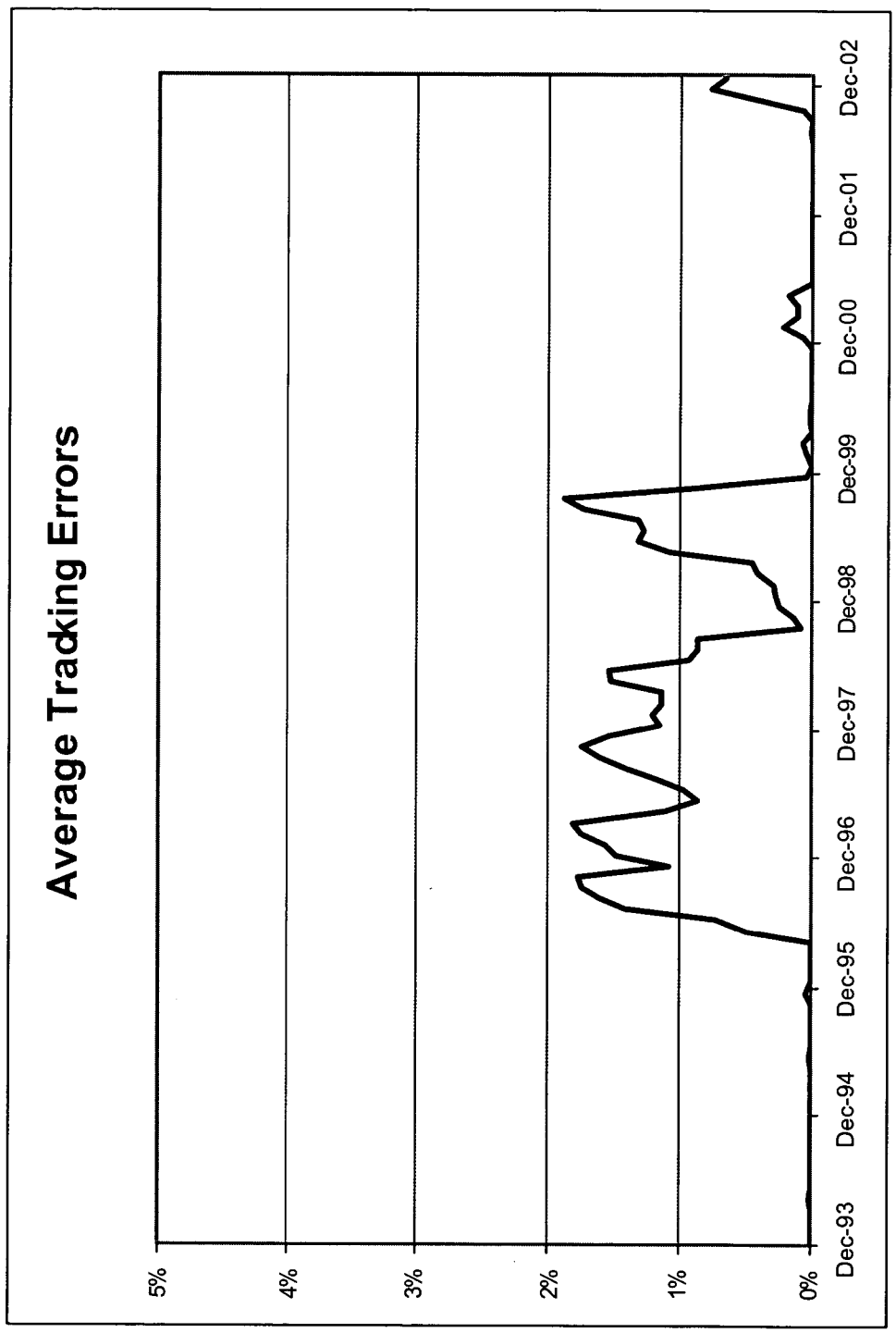
Figure 26:
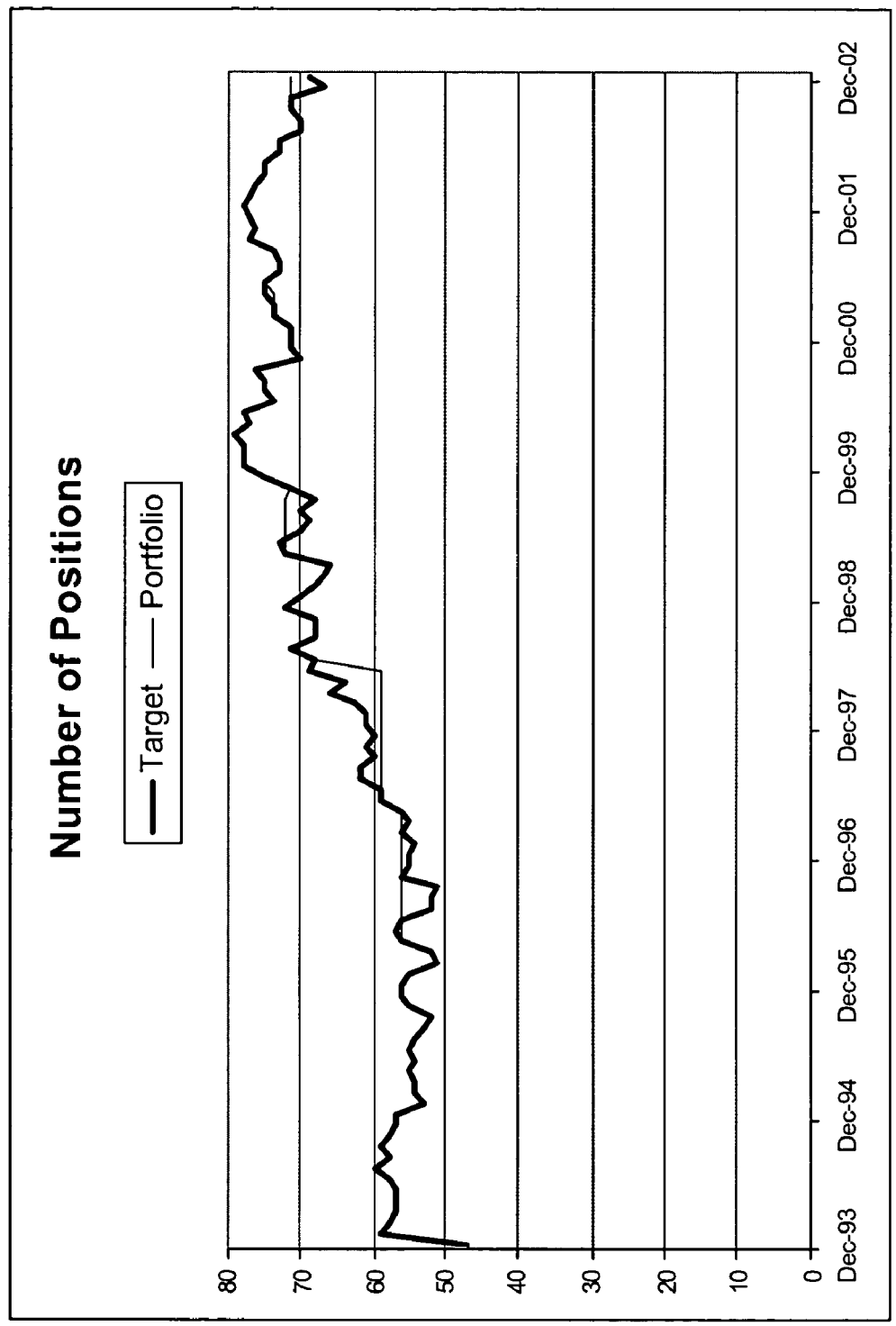

In this instance, random allocations or permutations were applied with constraints, i.e., with portfolio rebalancing suspended if the TSTGL would be greater than ±2% of the portfolio value, which results in a STG, LTG, and NAVs and taxes, as shown in FIG. 13, FIG. 14, and FIG. 15, respectively. The final NAV is $208,152 and the total tax paid is $40,532. The PTE between the target and actual portfolio is shown in FIG. 16, which indicates that STG are under control with a maximum PTE of 2.83% opposed to the maximal FWC PTE of 4.90%, and at a lesser frequency of PTE. As shown in FIG. 17, the rate of return associated with constrained portfolio rebalancing, according to the present invention, is significantly higher than the unconstrained counterparts. The preferred liquidation strategy, i.e., SWC, provides a 100 basis point advantage over the poorest tax strategy, i.e., FNC, and the PTE is rather mild.

Barra Risk Measures

Proxy risk estimates were employed to determine feasibility. The PTE based on the simulation runs indicate two key dates: March 1997 when all simulation runs cause a proxy tracking error between 2.5% and 3%, and the April 1999 when two simulation runs provide a temporary tracking error of 5%. The resultant Barra measures are shown in FIG. 18. In both instances, the portfolio risk is smaller than target portfolio or strategy risk. The tracking error between portfolio and strategy is reasonable as compared to the tracking error between the strategy and the benchmark. Overall, PTE seems to slightly underestimate the Barra tracking error (by about 15%). The beta of the portfolio vs. the benchmark is smaller than the beta of the strategy vs. the benchmark. Finally, there is no thesis violation in terms of beta in that both the portfolio and the strategy have a beta that is smaller than one.

FIGS. 19-28 graph the relevant data patterns for 20 simulations. Based on our research we recommend strongly to avoid a big aggregation of STG whenever possible. The according price for a temporary suspension of portfolio adaptation is a tracking error between the portfolio and the strategy, which, however, proves moderate. The best stock liquidation strategy is a randomized Specific Identification rather than a (perfectly rigid) LIFO or FIFO. Of course, 'randomized' means generation multiple runs and selection the most appropriate one under the given objective and constraints.

Our target function is to keep the aggregated STG below a certain cap. The main constraint is a tracking error cap between the portfolio and the strategy. However, this is not necessarily the only constraint. Other constraints such as beta, aggregated LTG, or (temporary) combination of aggregated STG and aggregated LTG may be other constraints. The tax overlay process can also be highly mechanized which is an important prerequisite. Based on our simulations, the performance enhancement is on the order of 100 basis points. How big is at some given time depends largely on the given market trend.

The present invention may be implemented in various types of computing environments, such as on a single computing device, or on a network of computing devices. In one embodiment, a system for managing investment portfolios according to the present invention includes a computing devices having software associated therewith, e.g., on a computer readable medium, that when executed provides the relevant functionality with regard to managing investment portfolios as described above.

Figure 2:
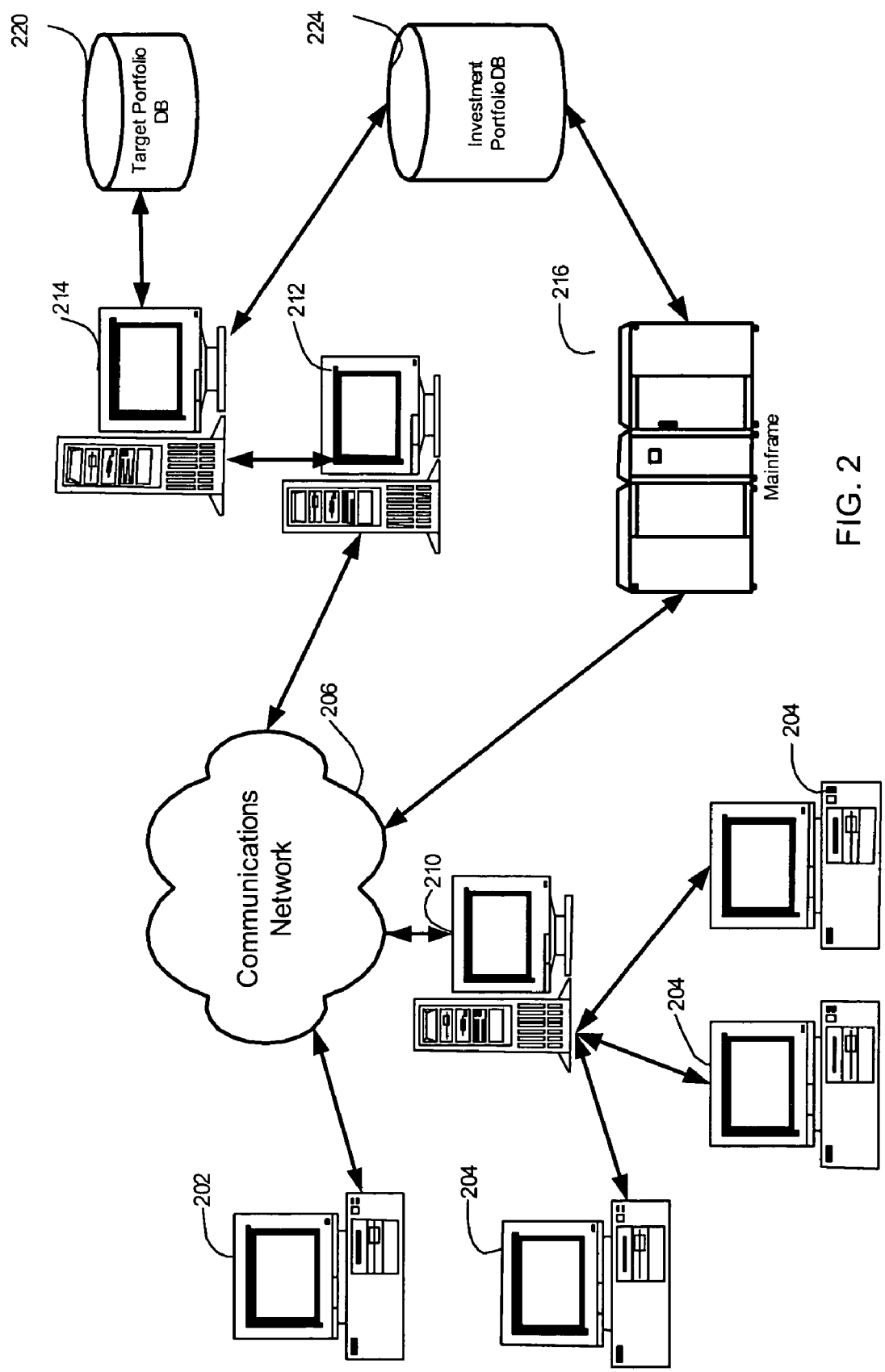
FIG. 2 is a block diagram of a computer system for managing investment portfolios according to one embodiment of the invention.

Referring to FIG. 2, a system for managing investment portfolio as described herein includes at least one client device 202, 204 connected over a communication network 206 to at least one server computer, such as proxy server 212, and/or an application server or servers 214, having at least one database associated therewith, such as an investment portfolio database 224. The client devices 204 may further be connected to the servers 212, 214 though a proxy server 210. In one embodiment, the system includes a mainframe computer 216 that is associated with the investment portfolio database 224. The application server and/or the mainframe computer preferably include therein software or computer programming that when executed identify investment portfolios for rebalancing, and rebalance the investment portfolio within the constraints noted above.

The communications network 206 is any suitable communications link, such as a local area network (LAN), wide area network (WAN), the Internet, a wireless network, or any combinations thereof. A client device 202, 204 is generally a multipurpose computer having a processor and memory that is capable of communicating with the server computers 210, 212, 214 and also capable of displaying information received there from. A client device may therefore be a personal computer (PC), special purpose computer, a workstation, a wireless device, such as personal digital assistants (PDA), cellular phones, two-way pagers, etc. The client device 202 for instance, may be a terminal for use by an asset management advisor and the client device 204 may be a terminal of a plurality of terminals for similar use in an office setting. The investment portfolio database 224 generally includes therein information regarding target portfolios and actual portfolios for at least one investor.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A method for managing investment portfolios using a computer, the method comprising:
    identifying a plurality of investment portfolio securities to be sold in connection with a rebalancing of the investment portfolio based on a difference between securities in the investment portfolio and a target portfolio;

randomly allocating, using the computer, the plurality of investment portfolio securities to at least one of a plurality of tax lots associated with the plurality of investment portfolio securities to be sold, wherein the plurality of securities to be sold are allocated to at least one tax lot associated with the securities to be sold based on at least one random allocation strategy selected from the group consisting of: randomly allocating the securities to be sold beginning with an earlier tax lot of a plurality of tax lots and proceeding to a later tax lot; and randomly allocating the securities to be sold beginning with a tax lot of a plurality of tax lots having a higher cost basis and proceeding to a tax lot with a lower cost basis;

computing, with the computer, an implied total short-term capital gain or loss that would result from the sale of the plurality of investment portfolio securities from the at least one tax lot; and rebalancing, using the computer, the investment portfolio if any of the short-term capital gain or loss, which would result from the rebalancing of the investment portfolio, falls within a threshold for short-term capital gains or losses, and not rebalancing the investment portfolio if any of the short-term capital gain or loss does not fall within the threshold.

2. The method of claim 1, wherein the at least one security to be sold is identified based on a difference between securities in the investment portfolio and a target portfolio.

3. The method of claim 1, wherein the plurality of securities to be sold are allocated randomly to a plurality of tax lots.

4. The method of claim 1, comprising:
identifying a plurality of securities to be sold in connection with the rebalancing of the investment portfolio based on a difference between securities in the investment portfolio and a target portfolio, the plurality of securities identified by allocating randomly, a plurality of times, the securities to be sold to a plurality of tax lots associated with the securities to be sold, computing an implied total short-term capital gain or loss that would result from the sale of the plurality of securities to be sold in accordance with each of the random allocations, and selecting from the plurality of random allocations one of the allocation that results in the smallest implied short-term capital gain or loss, and the allocation that most closely matches a pre-set targeted short-term capital gain or loss.

5. The method of claim 1, comprising rebalancing the investment portfolio if a total short-term capital gain or loss for the year, which would result from the rebalancing of the investment portfolio, falls within a threshold for short-term capital gains or losses, and not rebalancing the investment portfolio if the total short-term capital gain or loss for the year does not fall within the threshold.

6. The method of claim 5, wherein the threshold for short-term capital gains or losses is about 2% of the value of investment portfolio's assets.

7. The method of claim 5, wherein the threshold for short-term capital gains or losses is defined by an investor.

8. The method of claim 1, wherein the short-term capital gain or losses which would result from the rebalancing of the investment portfolio is computed as a sum of the short-term gain or losses of each of the at least one investment portfolio security to be sold in connection with a rebalancing of the investment portfolio.

9. A system for managing investment portfolios comprising at least one computing device having software associated therewith that when executed performs a method comprising:

identifying a plurality of investment securities to be sold in connection with a rebalancing of the investment portfolio based on a difference between securities in the investment portfolio and a target portfolio;

randomly allocating the plurality of investment securities to at least one of a plurality of tax lots associated with the plurality of investment portfolio securities to be sold, wherein the plurality of securities to be sold are allocated to at least one tax lot associated with the securities to be sold based on at least one random allocation strategy selected from the group consisting of: randomly allocating the securities to be sold beginning with an earlier tax lot of a plurality of tax lots and proceeding to a later tax lot; and randomly allocating the securities to be sold beginning with a tax lot of a plurality of tax lots having a higher cost basis and proceeding to a tax lot with a lower cost basis;

computing an implied total short-term capital gain or loss that would result from the sale of the plurality of investment portfolio securities from the at least one tax lot; and rebalancing the investment portfolio if the short-term capital gain or loss, which would result from the rebalancing of the investment portfolio, falls within a threshold for short-term capital gains or losses, and not rebalancing the investment portfolio if the short-term capital gain or loss does not fall within the threshold.

10. The system of claim 9, wherein the plurality of securities to be sold are allocated randomly to a plurality of tax lots.

11. The system of claim 9, wherein the method comprises:
identifying a plurality of securities to be sold in connection with the rebalancing of the investment portfolio based on a difference between securities in the investment portfolio and a target portfolio, the plurality of securities identified by allocating randomly, a plurality of times, the securities to be sold to a plurality of tax lots associated with the securities to be sold, computing an implied total short-term capital gain or loss that would result from the sale of the plurality of securities to be sold in accordance with each of the random allocations, and selecting from the plurality of random allocations the allocation that results in the smallest implied short-term capital gain or loss.

12. The system of claim 9, wherein the method comprises rebalancing the investment portfolio if a total short-term capital gain or loss for the year, which would result from the rebalancing of the investment portfolio, falls with a threshold for short-term capital gains or losses, and not rebalancing the investment portfolio if the total short-term capital gain or loss for the year does not fall within the threshold.

13. The system of claim 9, wherein the threshold for short-term capital gains or losses is about 2% of the value of investment portfolio's assets.

14. The system of claim 9, wherein the threshold for short-term capital gains or losses is defined by an investor.

15. The system of claim 9, wherein the short-term capital gain or losses which would result from the rebalancing of the investment portfolio is computed as a sum of the short-term gain or losses of each of the at least one investment portfolio security to be sold in connection with a rebalancing of the investment portfolio.

16. A system for managing investment portfolios comprising at least one computing device having software associated therewith that when executed performs a method comprising:
determining a difference between securities in the investment portfolio and a target portfolio;

identifying a plurality of securities to be sold based on the determined difference;

allocating randomly, a plurality of times, the securities to be sold to a plurality of tax lots associated with the securities to be sold, wherein the plurality of securities to be sold are allocated to the plurality of tax lots associated with the securities to be sold based on at least one random allocation strategy selected from the group consisting of: allocating randomly the securities to be sold beginning with an earlier tax lot of a plurality of tax lots and proceeding to a later tax lot; and allocating randomly the securities to be sold beginning with a tax lot of a plurality of tax lots having a higher cost basis and proceeding to a tax lot with a lower cost basis;

computing an implied total short-term capital gain or loss that would result from the sale of the plurality of securities to be sold in accordance with each of the random allocations;

selecting from the plurality of random allocations the allocation that results in the smallest implied short-term capital gain or loss; and rebalancing the investment portfolio if the implied short-term capital gain or loss for the selected random allocation falls within a threshold for short-term capital gains or losses, and not rebalancing the investment portfolio if the implied short-term capital gain or loss does not fall within the threshold.

* * * * *